United States Patent
Chen et al.

(10) Patent No.: US 10,862,530 B2
(45) Date of Patent: Dec. 8, 2020

(54) METHOD AND DEVICE FOR TRANSMITTING POSITIONING REFERENCE SIGNAL, AND COMPUTER STORAGE MEDIUM

(71) Applicant: ZTE CORPORATION, Shenzhen (CN)

(72) Inventors: Xianming Chen, Shenzhen (CN); Bo Dai, Shenzhen (CN); Kun Liu, Shenzhen (CN); Weiwei Yang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/306,032

(22) PCT Filed: Nov. 4, 2016

(86) PCT No.: PCT/CN2016/104684
§ 371 (c)(1),
(2) Date: Feb. 13, 2019

(87) PCT Pub. No.: WO2017/206437
PCT Pub. Date: Dec. 7, 2017

(65) Prior Publication Data
US 2019/0372617 A1    Dec. 5, 2019

(30) Foreign Application Priority Data

Jun. 3, 2016  (CN) .......................... 2016 1 0392336
Sep. 30, 2016  (CN) .......................... 2016 1 0879518

(51) Int. Cl.
*H04B 1/713*    (2011.01)
*H04L 5/00*    (2006.01)
*H04W 72/04*    (2009.01)

(52) U.S. Cl.
CPC ........... *H04B 1/713* (2013.01); *H04L 5/0007* (2013.01); *H04L 5/0051* (2013.01); *H04W 72/0446* (2013.01)

(58) Field of Classification Search
CPC ...... H04B 1/713; H04B 1/71635; H04B 7/06; H04L 5/0007; H04L 5/0012;
(Continued)

(56) References Cited

U.S. PATENT DOCUMENTS

2011/0081933 A1    4/2011  Suh
2012/0027110 A1*   2/2012  Han ..................... H04J 11/0079
                                                              375/260
(Continued)

FOREIGN PATENT DOCUMENTS

CN    101594336 A    12/2009
CN    101931857 A    12/2010
(Continued)

OTHER PUBLICATIONS

"Impact on System Information for In-band Operations of NB—IoT", Jan. 21, 2016, 3GPP TSG RAN WG2 NB—IoT Ad-Hoc Meeting; R2-160516; 3rd Generation Partnership Project (3GPP), Mobile Competence Centre; 650, Route Des Lucioles; 2 pgs.

(Continued)

*Primary Examiner* — Young T. Tse
(74) *Attorney, Agent, or Firm* — Li & Cai Intellectual Property (USA) Office

(57) ABSTRACT

The present invention provides a method and device for transmitting a positioning reference signal (PRS), and a computer storage medium. The method comprises: obtaining specified information related to transmission of a PRS, the specified information comprising at least one of a cycle, an offset, duration, subframe configuration information, and narrowband information; and determining a transmission
(Continued)

```
Specified information related to transmission of a
Positioning Reference Signal (PRS) is obtained          S202

↓

A transmission resource for the PRS is determined
based on the specified information, and the PRS is      S204
transmitted by using the transmission resource
``` resource for the PRS on the basis of the specified information, and transmitting the PRS by means of the transmission resource.

9 Claims, 6 Drawing Sheets

(58) Field of Classification Search
CPC .. H04L 5/0051; H04W 4/02; H04W 72/0446; H04W 72/0453
USPC ....... 375/130, 132, 135, 141, 146, 260, 295; 370/208, 335, 337, 342, 347; 455/438, 455/440, 442, 456.1, 456.3, 456.5, 456.6
See application file for complete search history.

(56) References Cited

U.S. PATENT DOCUMENTS

| | | | |
|---|---|---|---|
| 2012/0093122 A1 | 4/2012 | Dai | |
| 2013/0294391 A1 | 11/2013 | Guo | |
| 2013/0308567 A1 | 11/2013 | Chen et al. | |
| 2014/0349582 A1 | 11/2014 | Xiao et al. | |
| 2016/0195601 A1* | 7/2016 | Siomina | G01S 5/0205 455/456.1 |
| 2018/0054792 A1* | 2/2018 | Lee | H04L 5/00 |
| 2018/0098187 A1* | 4/2018 | Blankenship | H04L 27/2602 |
| 2018/0124787 A1* | 5/2018 | Wang | H04L 5/0048 |
| 2018/0180703 A1* | 6/2018 | Kim | G01S 1/04 |

FOREIGN PATENT DOCUMENTS

| | | |
|---|---|---|
| CN | 101998255 A | 3/2011 |
| CN | 102594756 A | 7/2012 |
| CN | 105577337 A | 5/2016 |
| WO | 2014019125 A1 | 2/2014 |

OTHER PUBLICATIONS

"Considerations on Positioning support for NB—IoT", Jan. 21, 2016; 3GPP TSG-RAN WG2 NB—IoT; R2-160448, 3rd Generation Partnership Project, Mobile Competence Centre; 650, Route Des Lucioles; 4 pgs.

"WF on NPRS pattern for NB—IoT Otdoa", Nov. 18, 2016, ZTE Microelectronics, 3GPP TSG RAN WG1 Meeting #87; R1-1613473; 3rd Generation Partnership Project (3GPP), Mobile Competence Centre; 650, Route Des Lucioles; 3 pgs.

"WF on NPRS Subframe Configuration for NB—IoT OTDOA", Nov. 18, 2016, ZTE Microelectronics, 3GPP TSG RAN WG1 Meeting #87; R1-1613474; 3rd Generation Partnership Project (3GPP), Mobile Competence Centre; 650, Route Des Lucioles; 2 pgs.

"OTDOA for NB—IoT", Nov. 18, 2016; 3GPP TSG RAN WG1 Meeting #87; R1-1612602; 3rd Generation Partnership Project (3GPP), Mobile Competence Centre; 650, Route Des Lucioles; 9 pgs.

International Search Report in the international application No. PCT/CN2016/104684, dated Feb. 22, 2017, 2 pgs.

English Translation of the Written Opinion of the International Search Authority in the international application No. PCT/CN2016/104684, dted Feb. 22, 2017, 4 pgs.

Supplementary European Search Report in the European application No. 16903819.7, dated Feb. 11, 2019, 13 pgs.

* cited by examiner

METHOD AND DEVICE FOR TRANSMITTING POSITIONING REFERENCE SIGNAL, AND COMPUTER STORAGE MEDIUM

TECHNICAL FIELD

The disclosure relates to the field of wireless communications, and specifically, to a method and apparatus for transmitting positioning reference signal and a computer storage medium.

BACKGROUND

To satisfy a requirement of Cellular Internet of Things (C-IoT), a new access system designed and named as the NarrowBand-Cellular Internet of Things (NB-IoT) is put forward in the $69^{th}$ plenary session of the 3rd Generation Partnership Project (3GPP). A NB-IoT system is focused on low-complexity and low-throughput radio frequency access technologies, and its main research objectives include improved indoor coverage, support of massive low-throughput user equipment, relatively low latency sensitivity, ultra-low cost of device, low power loss of device and network architecture. Both uplink and downlink transmission bandwidths of the NB-IoT system are 180 kHz, and are the same as a bandwidth of a Physical Resource Block (PRB) of a Long Term Evolution (LTE) system. This facilitates reusing of relevant design of an existing LTE system in the NB-IoT system. In addition, three different operation modes are supported by the NB-IoT system: (1) a Stand-alone operation, for example, a spectrum currently used by an Enhanced Data Rate for Global System for Mobile Communications Evolution Radio Access Network (GERAN) system is used to replace one or more carrier(s) of the Global systems for Mobile Communication (GSM); (2) a Guard band operation, for example, a resource block that is not used within a guard band range of an LTE carrier is used; and (3) an In-band operation, for example, a resource block within a normal range of an LTE carrier is used.

In many NB-IoT applications (for example, tracking of fixed assets), it is important to position and track a terminal. Determining a position of a terminal device based on a Positioning Reference Signal (PRS) from a network is a positioning method commonly used currently.

There is currently no effective solution for transmitting a PRS in the NB-IoT system.

SUMMARY

In view of this, embodiments of the disclosure provide a method and apparatus for transmitting a positioning reference signal and a computer storage medium.

According to an aspect of the embodiments of the present disclosure, a method for transmitting a positioning reference signal is provided, and the method includes: obtaining specified information related to transmission of a Positioning Reference Signal (PRS), where the specified information includes at least one of a period, an offset, a duration, subframe configuration information, or narrowband information; and determining a transmission resource for the PRS based on the specified information, and transmitting the PRS by using the transmission resource.

The transmission resource includes at least one of a target radio frame, a target subframe, or a target narrowband that are allowed for transmitting the PRS.

The determining a transmission resource for the PRS based on the specified information includes: determining, based on the period, the offset, and the duration, the target radio frame allowed for transmitting the PRS.

The determining, based on the period, the offset, and the duration, the target radio frame allowed for transmitting the PRS includes: determining, according to a relational expression, a start radio frame corresponding to the period $T_{PRS}$ and the offset $\Delta_{PRS}$, where the relational expression is $(n_f - \Delta_{PRS}) \bmod (T_{PRS}) = 0$, and $n_f$ is a number of the start radio frame; and determining, based on the start radio frame and the duration, the target radio frame used for transmitting the PRS, where the duration is configured to indicate that the PRS is transmitted in $N_{PRS}$ consecutive radio frames starting from the start radio frame, and $N_{PRS}$ is a value of the duration and is a positive integer not less than 1.

The determining a transmission resource for the PRS based on the specified information includes: determining, based on the subframe configuration information, target subframes allowed for transmitting the PRS in the target radio frame.

The subframe configuration information is an N×10 bitmap, and is used to indicate whether each of N×10 subframes in every N consecutive target radio frames is the target subframe, where N is an integer greater than 0.

When the target subframe is a subframe for transmitting a specified channel or a specified signal, skipping transmitting the PRS in the target subframe, where the specified channel or the specified signal includes at least one of: a Narrowband Physical Broadcast Channel (NPBCH), a Narrowband Primary Synchronization Signal (NPSS), a Narrowband Secondary Synchronization Signal (NSSS), a Narrowband Physical Downlink Shared Channel (NPDSCH) carrying a Narrowband System Information Block 1 (NSIB1), or an NPDSCH carrying a narrowband System Information (SI) message.

When the target subframe is a subframe for transmitting a specified channel or a specified signal, skipping transmitting the PRS in the target subframe, or puncturing data of the specified channel or the specified signal at a location of a resource element occupied by the PRS, where the specified channel or the specified signal includes at least one of: a Narrowband Physical Downlink Control Channel (NPDCCH), a non-broadcast NPDSCH, or a downlink channel or a downlink signal of a Long Term Evolution (LTE) system.

The determining a transmission resource for the PRS based on the specified information includes: determining, based on the narrowband information, at least one target narrowband allowed for transmitting the PRS.

When there are more than one target narrowband, the PRS is transmitted in the more than one target narrowband in a frequency-hopping manner.

A granularity of the frequency-hopping includes an integer number of radio frames and a number of the radio frames corresponding to the granularity is equal to $\frac{1}{10}$ of a number of bits of the subframe configuration information.

The PRS has at least one of the following characteristics: a sequence generation manner of the PRS is the same as that of a Narrowband Reference Signal (NRS); the PRS is not mapped to an Orthogonal Frequency Division Multiplexing (OFDM) symbol, in which there is NRS transmission, in the target subframe; the PRS is not mapped to an OFDM symbol, in which there is LTE Cell-specific Reference Signal (CRS) transmission, in the target subframe; the PRS is not mapped to an LTE Physical Downlink Control Channel (PDCCH) region in the target subframe; or for any of target OFDM symbols allowed for transmitting the PRS in the target subframe, the PRS is mapped to two resource elements in the target OFDM symbol.

Locations of the two resource elements are determined according to at least one of the following parameters: a Physical Cell Identity (PCI), a radio frame index, a subframe index, an OFDM symbol index, or a narrowband index.

The locations of the two resource elements are determined according to the following equation: $k=6m\pm(6-1+v_{shift})$ mod (6), where m=0,1; k indicates an index of a resource element that is used for transmitting the PRS in the target OFDM symbol, 1 indicates an index of the target OFDM symbol, and $v_{shift}$ indicates a cell-specific frequency shift and is determined according to at least one of the following parameters: the PCI, the radio frame index, the subframe index, or the narrowband index.

The target subframe is a valid subframe or an invalid subframe, and for an in-band operation, when the target subframe is a valid subframe, the target OFDM symbol allowed for transmitting the PRS is an OFDM symbol that is in the target subframe and that is not used as the LTE PDCCH region and not used for transmitting an LTE CRS or an NRS, or an OFDM symbol that is in OFDM symbols of the target subframe except the first three OFDM symbols and that is not used for transmitting an LTE CRS or an NRS, where a terminal assumes that there is always LTE CRS transmission or there is always no LTE CRS transmission in the target subframe, or a base station indicates whether there is LTE CRS transmission in the target subframe; or when the target subframe is an invalid subframe, the target OFDM symbol allowed for transmitting the PRS is an OFDM symbol that is in the target subframe and that is not used as the LTE PDCCH region and not used for transmitting an LTE CRS, or an OFDM symbol that is in OFDM symbols of the target subframe except the first three OFDM symbols and that is not used for transmitting an LTE CRS, where a terminal assumes that there is always LTE CRS transmission or there is always no LTE CRS transmission in the target subframe, or a base station indicates whether there is LTE CRS transmission in the target subframe.

When an indicator indicating whether Physical Cell Identity (PCI) is the same is set to True, if the target subframe is a valid subframe, the terminal assumes that there is always LTE CRS transmission in the target subframe.

The target subframe is a valid subframe or an invalid subframe, and for a standalone operation and a guard band operation, when the target subframe is a valid subframe, the target OFDM symbol allowed for transmitting the PRS is an OFDM symbol that is in the target subframe and that is not used for transmitting a Narrowband Reference Signal (NRS) or an OFDM symbol that is in the target subframe, whose index is greater than 0, and that is not used for transmitting a Narrowband Reference Signal (NRS); or when the target subframe is an invalid subframe, the target OFDM symbols allowed for transmitting the PRS are all OFDM symbols in the target subframe or all OFDM symbols in the target subframe whose indexes are greater than 0.

The PRS has at least one of the following characteristics: the PRS is not mapped to a resource element that is used for transmitting an NRS in the target subframe; the PRS is not mapped to a resource element that is used for transmitting an LTE CRS in the target subframe; or the PRS is not mapped to an LTE PDCCH region in the target subframe.

The target subframe is a valid subframe or an invalid subframe, and for an in-band operation, when the target subframe is a valid subframe, the PRS is mapped to all resource elements in the target subframe that are not used as an LTE PDCCH region and that are not used for transmitting an LTE CRS or an NRS, or the PRS is mapped to all resource elements that are in OFDM symbols of the target subframe except the first three OFDM symbols and that are not used for transmitting an LTE CRS or an NRS; or when the target subframe is an invalid subframe, the PRS is mapped to all resource elements in the target subframe that are not used as an LTE PDCCH region and that are not used for transmitting an LTE CRS, or the PRS is mapped to all resource elements that are in OFDM symbols of the target subframe except the first three OFDM symbols and that are not used for transmitting an LTE CRS.

The target subframe is a valid subframe or an invalid subframe, and for a standalone operation or a guard band operation, when the target subframe is a valid subframe, the PRS is mapped to all resource elements in the target subframe that are not used for transmitting an NRS, or the PRS is mapped to all resource elements that are in OFDM symbols of the target subframe except the first three OFDM symbols and that are not used for transmitting an NRS; or when the target subframe is an invalid subframe, the PRS is mapped to all resource elements in the target subframe, or the PRS is mapped to all resource elements that are in OFDM symbols of the target subframe except the first three OFDM symbols.

After the transmitting the PRS by using the transmission resource, the method further includes: instructing, by a base station by using a Msg2 message, a terminal to feed back position information.

After the transmitting the PRS by using the transmission resource, the method further includes: when a random access process is triggered by Downlink Control Information (DCI), feeding back, by a terminal, position information in a Msg3 message; or when a random access process is not triggered by DCI, feeding back, by a terminal, position information in a Msg5 message.

Before, after, or during the transmitting the PRS by using the transmission resource, the method further includes: obtaining, by a terminal, information about a neighboring base station from a serving base station, where the information about the neighboring base station includes at least one of: information related to PRS transmission, configuration information of a valid subframe, an indicator indicating whether PCI is the same, an indication of whether there is LTE CRS transmission in the target subframe allowed for transmitting the PRS, or a size of an LTE PDCCH region; and receiving, based on the information about the neighboring base station, the PRS sent by the neighboring base station.

The locations of the two resource elements are determined according to the following equation:

$$k=6(m+2*n_{PRB})+(6-l+v_{shift})\mod(6), \text{ where } m=0,1;$$

k indicates an index of a resource element that is used for transmitting the PRS in the target OFDM symbol, 1 indicates an index of the target OFDM symbol, $v_{shift}$ indicates a cell-specific frequency shift and is determined according to at least one of the following parameters: the PCI, the radio frame index, the subframe index, or the narrowband index; and $n_{PRB}$ is an index of a narrowband in which the resource element for the PRS exists.

The offset $\Delta_{PRS}$ is used to indicate a deviation between a start location of the transmission resource for the PRS in the period $T_{PRS}$ and a start location of the period $T_{PRS}$ and a measurement unit of $\Delta_{PRS}$ is N subframes.

N is 40, 10, or 20.

Jointly encoding is performed on the period $T_{PRS}$ and the offset $\Delta_{PRS}$, and values of the period $T_{PRS}$ and the offset $\Delta_{PRS}$ are indicated by using an index $I_{PRS}$.

The duration T is used to indicate a time domain length occupied by the transmission resource for the PRS in the period.

The duration T includes at least one of:

K time lengths, where the time length is equal to M subframes, and

K and M are integers greater than or equal to 1.

The K time lengths are continuously distributed in a time domain.

A value of M is equal to that of N.

Target subframes, allowed for transmitting the PRS, in the time length are determined according to the subframe configuration information.

The subframe configuration information is a bitmap of an L-bit length, and L is an integer greater than 0.

The length L is one of:

the length L is equal to M;

the length L is less than M;

the length L is less than M, and the length L is equal to a number of invalid subframes in the time length; or the length L is less than a number of invalid subframes in the time length.

When the length L is less than the number of invalid subframes in the time length, the bitmap of an L-bit length indicates whether the first L invalid subframes of the invalid subframes in the time length are target subframes of the PRS, or the bitmap of an L-bit length indicates whether the last L invalid subframes of the invalid subframes in the time length are target subframes of the PRS.

The subframe configuration information of the K time lengths is the same.

When the target subframe is a subframe for transmitting a specified channel or a specified signal, skipping transmitting the PRS in the target subframe, where the specified channel or the specified signal includes at least one of: a Narrowband Physical Broadcast Channel (NPBCH), a Narrowband Primary Synchronization Signal (NPSS), a Narrowband Secondary Synchronization Signal (NSSS), a Narrowband Physical Downlink Shared Channel (NPDSCH) carrying a Narrowband System Information Block 1 (NSIB1), or an NPDSCH carrying a narrowband System Information (SI) message.

When the target subframe is a subframe for transmitting a specified channel or a specified signal, skipping transmitting the PRS in the target subframe, or puncturing data of the specified channel or the specified signal at a location of a resource element occupied by the PRS, where the specified channel or the specified signal includes at least one of: a Narrowband Physical Downlink Control Channel (NPDCCH), a non-broadcast NPDSCH, or a downlink channel or a downlink signal of a Long Term Evolution (LTE) system.

Narrow bands in which the transmission resources for the PRS in the K time lengths exist are determined according to a predetermined rule.

The predetermined rule is at least one of:

transmission resources for the PRS in Q time lengths that are continuous in time domain exist in the same narrowband, where Q is an integer greater than or equal to 1;

transmission resources for the PRS in two sets of Q time lengths adjacent to each other in time domain exist in different narrow bands; or transmission resources for the PRS in the K time lengths exist in the same narrowband.

The predetermined rule is at least one of:

the narrow bands in which the transmission resources for the PRS in the K time lengths exist are determined according to a formula $I_{NB,j}=\mod(j-1, N_{NB}^{PRS})+1$, where $N_{NB}^{PRS}$ is a number of the narrow bands in which the transmission resources for the PRS in the K time lengths exist, and $I_{NB,j}$ is an index of a narrowband, in $N_{NB}^{PRS}$ narrow bands, in which a transmission resource for the PRS in a $j^{th}$ time length exists;

the narrow bands in which the transmission resources for the PRS in the K time lengths exist are determined according to a formula $I_{NB,j}=\mod(j,N_{NB}^{PRS})$, where $N_{NB}^{PRS}$ is a number of the narrow bands in which the transmission resources for the PRS in the K time lengths exist, and $(I_{NB,j}+1)$ is an index of a narrowband, in $N_{NB}^{PRS}$ narrow bands, in which a transmission resource for the PRS in a $(j+1)^{th}$ time length exists; or the narrow bands in which the transmission resources for the PRS in the K time lengths exist are determined according to a formula $I_{NB,j}=\mod(\lfloor j/Q \rfloor, N_{NB}^{PRS})$, where $N_{NB}^{PRS}$ is a number of the narrow bands in which the transmission resources for the PRS in the K time lengths exist, $(I_{NB,j}+1)$ is an index of a narrowband, in $N_{NB}^{PRS}$ narrow bands, in which a transmission resource for the PRS in a $(j+1)^{th}$ time length exists, and Q is an integer greater than or equal to 1.

The specified information further includes at least one of:

transmit power configuration information of the PRS;

resource configuration information of an LTE PRS; or transmit power configuration information of the LTE PRS.

The transmit power configuration information of the PRS is:

a deviation value between transmit power of the PRS and transmit power of a predetermined reference signal.

The predetermined reference signal is at least one of:

an LTE PRS;

an LTE-specific reference signal CRS; or a narrowband reference signal NRS.

According to another aspect of embodiments of the present disclosure, an apparatus for transmitting a positioning reference signal is provided, which includes: an obtaining unit, configured to obtain specified information related to transmission of a Positioning Reference Signal (PRS), where the specified information includes at least one of a period, an offset, a duration, subframe configuration information, or narrowband information; and a transmission unit, configured to determine, based on the specified information, a transmission resource for the PRS, and transmit the PRS by using the transmission resource.

The transmission resource includes at least one of a target radio frame, a target subframe, or a target narrowband that are allowed for transmitting the PRS.

The transmission unit includes: a first determining module, configured to determine, based on the period, the offset and the duration, the target radio frame allowed for transmitting the PRS.

The first determining module includes: a first determining submodule, configured to determine, according to a relational expression, a start radio frame corresponding to the period $T_{PRS}$ and the offset $\Delta_{PRS}$, where the relational expression is $(n_f-\Delta_{PRS}) \mod (T_{PRS})=0$, and $n_f$ is a number of the start radio frame; and a second determining submodule, configured to determine, based on the start radio frame and the duration, the target radio frame used for transmitting the PRS, where the duration is used to indicate that the PRS is transmitted in $N_{PRS}$ consecutive radio frames starting from the start radio frame, and $N_{PRS}$ is a value of the duration and is a positive integer not less than 1.

The transmission unit includes: a second determining module, configured to determine, based on the subframe configuration information, target subframes allowed for transmitting the PRS in the target radio frame.

The transmission unit includes: a third determining module, configured to determine, based on the narrowband information, at least one target narrowband allowed for transmitting the PRS.

According to another embodiment of the present disclosure, a storage medium is provided, where the storage medium is configured to store program code for executing the following steps: obtaining specified information related to transmission of a Positioning Reference Signal (PRS), where the specified information includes at least one of a period, an offset, a duration, subframe configuration information, or narrowband information; and determining a transmission resource for the PRS based on the specified information, and transmitting the PRS by using the transmission resource. That is, the embodiments of the disclosure further provide a computer storage medium having stored therein a group of instructions, and when the instructions are executed, caused at least one processor to perform the above-described method for transmitting a positioning reference signal.

In the embodiments of the disclosure, specified information related to transmission of a PRS is obtained, where the specified information includes at least one of a period, an offset, duration, subframe configuration information or narrowband information; and a transmission resource for the PRS is determined based on the specified information, and the PRS is transmitted by using the transmission resource. In this way, a technical problem that there is currently no effective solution for transmitting a PRS in an NB-IoT system is resolved, and a technical effect of transmitting a PRS in the NB-IoT system is achieved.

BRIEF DESCRIPTION OF THE DRAWINGS

The accompanying drawings described herein are provided for further understanding of the disclosure, and constitute a part of the application. The exemplary embodiments and illustrations thereof of the disclosure are intended to explain the disclosure, and do not constitute inappropriate limitations to the disclosure. In the accompanying drawings.

DETAILED DESCRIPTION

The disclosure is described in detail below with reference to the accompanying drawings and in conjunction with embodiments. It should be noted that the embodiments in the application and features in the embodiments may be combined with each other in a non-conflicting situation.

It should be noted that the terms "first", "second", and so on in the description and claims and in the above accompanying drawings of the disclosure are intended to distinguish between similar objects, and do not necessarily indicate a specific order or sequence.

First Embodiment

Figure 1:
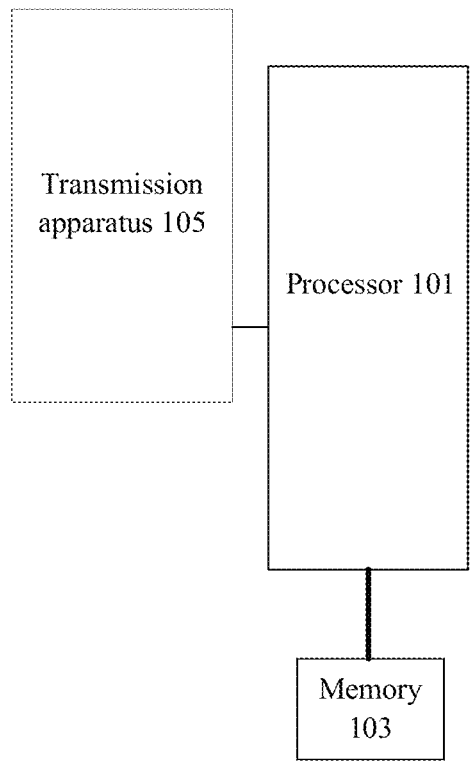
FIG. 1 is a structure block diagram of a computer terminal according to an embodiment of the disclosure.

A method provided in the first embodiment in this application may be performed in a mobile terminal, a computer terminal, or a similar operation apparatus. Running on the computer terminal is taken as an example. As shown in FIG. 1, the computer terminal may include one or more processors 101 (only one processor is shown in the figure) (the processor 101 may include, but is not limited to, a processing apparatus such as a microprocessor MCU or a programmable logic component FPGA), a memory 103 configured to store data, and a transmission apparatus 105 configured to have a communication function. A person of ordinary skill in the art may understand that, a structure shown in FIG. 1 is only an example, and does not limit a structure of the foregoing electronic apparatus.

The memory 103 may be configured to store a software program and a module of application software, for example, a program instruction/module corresponding to a control method of a device in an embodiment of the disclosure. The processor 101 performs various functional applications and data processing by running the software program and module stored in the memory 103, that is, implements the foregoing method. The memory may include a high-speed random memory and may further include a nonvolatile memory, such as one or more magnetic storage apparatuses, a flash memory, or other nonvolatile solid-state memory. In some examples, the memory may further include memories that are remotely disposed relative to the processor, and the remote memories may be connected to the computer terminal through a network. An example of the foregoing network includes, but is not limited to, the Internet, an intranet, a local area network, a mobile communications network, and a combination thereof.

The transmission apparatus is configured to receive or send data through a network. A specific example of the foregoing network may include a wireless network provided by a communication provider of the computer terminal. In an example, the transmission apparatus includes a Network Interface Controller (NIC), and the NIC may be connected to another network device through a base station, so as to communicate with the Internet. In an example, the transmission apparatus may be a Radio Frequency (RF) module, and the RF module is configured to communicate with the Internet in a wireless manner.

According to this embodiment of the disclosure, an embodiment of a method for transmitting a positioning reference signal is provided. It should be noted that, steps shown in a flowchart of the accompanying drawings may be performed in a computer system storing a group of computer-executable instructions and the like. In addition, although a logical sequence is shown in the flowchart, in some cases, the steps shown or described may be performed in a sequence different from the sequence used herein.

Figure 2:
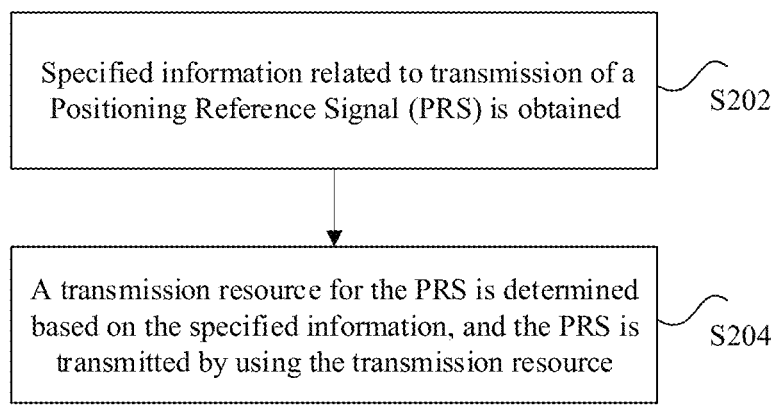
FIG. 2 is a flowchart of a method for transmitting a positioning reference signal according to an embodiment of the disclosure.

FIG. 2 is a flowchart of a method for transmitting a positioning reference signal according to an embodiment of the disclosure. As shown in FIG. 2, the transmission method includes the following steps.

At S202, specified information related to transmission of a positioning reference signal (PRS) is obtained, where the specified information includes at least one of a period, an offset, duration, subframe configuration information, and narrowband information.

At S204, a transmission resource for the PRS is determined based on the specified information, and the PRS is transmitted by using the transmission resource.

According to the foregoing embodiment, when the PRS needs to be transmitted, the specified information related to transmission of the PRS is obtained, where the specified information includes at least one of the period, the offset, the duration, the subframe configuration information, and the narrowband information; and the transmission resource for the PRS is determined based on the specified information, and the PRS is transmitted by using the transmission resource. In this way, a technical problem that there is currently no effective solution for transmitting a PRS in an NB-IoT system is resolved, and a technical effect of transmitting a PRS in the NB-IoT system is achieved.

Optionally, an execution body of the foregoing steps may be a base station, a terminal, or the like, but is not limited thereto.

It should be noted that, the PRS involved in this application is a narrowband PRS, and the foregoing specified information may be predefined, or indicated to a terminal device by using signaling (for example, by using cell-specific signaling and/or terminal-specific signaling), or the foregoing specified information may be transferred by using existing information as a carrier, and the application is not limited to this. According to the foregoing embodiment, the base station or the terminal can flexibly configure a resource for transmitting the PRS according to an actual transmission status of downlink data. On one hand, a performance of the positioning of terminal devices with different Coverage Levels (CL) is ensured, and on the other hand, blocking of normal downlink data transmission caused by PRS transmission is avoided to some extent.

In the foregoing embodiment, the transmission resource includes at least one of target radio frames, target subframes, and a target narrowband that are allowed for transmitting the PRS.

The PRS has at least one of the following characteristics: a sequence of the PRS is generated in the same manner as that of a Narrowband Reference Signal (NRS); the PRS is not mapped to an Orthogonal Frequency Division Multiplexing (OFDM) symbol for transmitting the NRS in the target subframe; the PRS is not mapped to an OFDM symbol for transmitting a LTE Cell-specific Reference Signal (CRS) in the target subframe; the PRS is not mapped to an Physical Downlink Control Channel (PDCCH) region of the LTE in the target subframe; and for any of target OFDM symbols allowed for transmitting the PRS in the target subframe, the PRS is mapped to two resource elements in the target OFDM symbol. Using the same method for generating the sequence as that of the NRS facilitates simplifying a design of the PRS, and that the PRS is not mapped to the OFDM symbols for transmitting NRS or LTE CRS and is not mapped to the LTE PDCCH region facilitates using all power for PRS transmission, thereby improving PRS-based positioning performance.

Optionally, the operation of determining a transmission resource for the PRS based on the specified information includes: determining, based on the period, the offset, and the duration, target radio frames allowed for transmitting the PRS, where a radio frame is used as a unit for all of the period, the offset, and the duration.

Optionally, the target radio frames in the transmission resource for the PRS may be determined based on the specified information in the following manner: determining, according to a relational expression, a start radio frame corresponding to the period $T_{PRS}$ and the offset $\Delta_{PRS}$, where the relational expression is $(n_f - \Delta_{PRS}) \bmod (T_{PRS}) = 0$, and $n_f$ is a number of the start radio frame; determining, based on the start radio frame and the duration, the target radio frames used for transmitting the PRS, where the duration is used to indicate that the PRS is transmitted in $N_{PRS}$ consecutive radio frames starting from the start radio frame, and $N_{PRS}$ is a value of the duration and is a positive integer not less than 1. In other words, the target radio frames allowed for transmitting the PRS are $N_{PRS}$ consecutive radio frames starting from the start radio frame. To simultaneously ensure positioning performances of the terminal devices with different coverage levels (including normal, extended, and extreme coverage), relatively long transmission duration may be set. For example, assuming that a value range of $N_{PRS}$ is 5, 10, 20, or 40, $N_{PRS}$ may be set to 40.

Optionally, the target subframes in the transmission resource for the PRS may be determined based on the specified information in the following manner: determining the target subframes, allowed for transmitting the PRS, in the target radio frame based on the subframe configuration information.

The foregoing subframe configuration information is an N×10 bitmap, and is used to indicate whether each of N×10 subframes in every N consecutive target radio frames is the target subframe, where N is an integer greater than 0. Independently indicating an available subframe (that is, the target subframe) used for transmitting the PRS is helpful to obtain sufficient flexibility of resource configuration for the PRS. If the subframe configuration information is not indicated, the terminal device may consider that all of the subframes are available subframes (that is, the target subframes) for PRS transmission.

In addition, a configuration of the available subframes for PRS transmission may also be equivalent to a configuration of valid subframes of a system. In this case, an existing configuration of the valid subframes of the system is regarded as the configuration of the available subframes for PRS transmission, and the available subframes for PRS transmission is equivalent to the valid subframes of the system. This method is helpful to reduce control overheads, but has less flexibility compared with the configuration that independently indicates the available subframes for the PRS.

It should be noted that, when the target subframe is a subframe for transmitting a specified channel or a specified signal, transmitting the PRS in the target subframe is not performed. This method is helpful to ensure transmission performance of a specified channel or a specified signal with a higher transmission priority. The specified channel or the specified signal includes at least one of: a Narrowband Physical Broadcast Channel (NPBCH), a Narrowband Primary Synchronization Signal (NPSS), a Narrowband Secondary Synchronization Signal (NSSS), a Narrowband Physical Downlink Shared Channel (NPDSCH) carrying a Narrowband System Information Block 1 (NSIB1), or an NPDSCH carrying a narrowband System Information (SI) message.

Alternatively, when the target subframe is a subframe for transmitting a specified channel or a specified signal, transmitting the PRS in the target subframe is not performed, or data of the specified channel or the specified signal at a location of a resource element occupied by the PRS is punctured. The former is helpful to avoid affecting transmission performance of the specified channel or the specified signal, while the latter ensures transmission of the specified channel or the specified signal and meanwhile avoids interference with PRS transmission. The specified channel or the specified signal includes at least one of: a Narrowband Physical Downlink Control Channel (NPDCCH), a non-broadcast NPDSCH, or a downlink channel or a downlink signal of a Long Term Evolution (LTE) system.

Optionally, locations of the two resource elements for transmitting the PRS in the target OFDM symbol are determined according to at least one of: a Physical Cell Identity (PCI), a radio frame index, a subframe index, an OFDM symbol index, or a narrowband index. Determining the resource element for transmitting the PRS according to the foregoing parameter is helpful to improve an interference randomization effect of PRS transmission between different cells.

Specifically, the locations of the two resource elements are determined according to the following equation: $k=6m+(6-l+v_{shift})\mod(6)$, where $m=0, 1$; k indicates an index of a resource element that is used for transmitting the PRS in the target OFDM symbol, l indicates an index of the target OFDM symbol, and $v_{shift}$ indicates a cell-specific frequency shift and is determined according to at least one of: the PCI, the radio frame index, the subframe index, or the narrowband index.

In practical applications, the locations of the two resource elements are determined according to the following equation.

$k=6(m+2*n_{PRB})+(6-l+v_{shift})\mod(6)$, where $m=0,1$.

k indicates an index of a resource element that is used for transmitting the PRS in the target OFDM symbol, l (lowercase L) indicates an index of the target OFDM symbol, $v_{shift}$ indicates a cell-specific frequency shift and is determined according to at least one of: the Physical Cell Identity (PCI), the radio frame index, the subframe index, or the narrowband index, and $n_{PRB}$ is an index of a narrowband where the resource element for the PRS is located.

Herein, if the narrowband where the resource element for the PRS is located is within a system bandwidth of the LTE, $n_{PRB}$ indicates an index of a Resource Block (RB or referred to as a Physical Resource Block (PRB)) occupied by the narrowband resource in the system bandwidth of the LTE.

It should be noted that the narrowband index is a physical index or a logical index, where the physical index is an index in all narrowband ranges supported by the system, and the logical index is an index in a narrowband range in which a PRS is transmitted. Determining the locations of the two resource elements according to the narrowband index is applicable to a case in which more than one narrowband are used for PRS transmission.

It should be further noted that in this embodiment of the disclosure, unless otherwise specified, the OFDM symbol index is an index of an OFDM symbol within a timeslot of a subframe. Because each timeslot of the subframe includes seven OFDM symbols, a value range of the OFDM symbol index is from 0 to 6. To be specific, an index of the first OFDM symbol in each timeslot of a subframe is 0, and an index of the last OFDM symbol in each timeslot of the subframe is 6. The subframe index is a subframe index within a radio frame. Because one radio frame includes 10 subframes, a value range of the subframe index is from 0 to 9. To be specific, an index of the first subframe in a radio frame is 0 and an index of the last subframe in the radio frame is 9.

In an alternative embodiment, for an in-band operation, the target subframe is a valid subframe or an invalid subframe.

It should be noted that the valid subframe in this embodiment is a subframe that supports transmission of an NPDCCH and an NPDSCH (excluding an NPDSCH used to carry an NSIB1 message) (configuration information of the valid subframe is indicated by using the NSIB1 message). An invalid subframe in this embodiment is a subframe that does not support transmission of an NPDCCH and an NPDSCH (excluding an NPDSCH used to carry an NSIB1 message) and that is not used for transmission of an NPSS/NSSS, an NPBCH, and an NSIB1.

Specifically, if the target subframe is a valid subframe, the target OFDM symbol that is allowed for transmitting the PRS is an OFDM symbol that is in the target subframe and that is not used as an LTE PDCCH region and not used for transmitting an LTE CRS or an NRS, or an OFDM symbol that is in OFDM symbols of the target subframe except the first three OFDM symbols and that is not used for transmitting an LTE CRS or an NRS. The former is beneficial to maximize a number of OFDM symbols that is in the target subframe and that can be used for transmitting the PRS (that is, a number of target OFDM symbols). The latter makes a number of OFDM symbols that can be used for transmitting the PRS (that is, a number of target OFDM symbols) not rely on an LTE control region (always assuming that a largest LTE PDCCH region is used), and therefore is relatively simple.

If the target subframe is an invalid subframe, the target OFDM symbol that is allowed for transmitting the PRS is an OFDM symbol that is in the target subframe and that is not used as an LTE PDCCH region and not used for transmitting an LTE CRS, or an OFDM symbol that is in OFDM symbols of the target subframe except the first three OFDM symbols and that is not used for transmitting an LTE CRS. The former is beneficial to maximize a number of OFDM symbols that is in the target subframe and that can be used for transmitting the PRS (that is, a number of target OFDM symbols). The latter makes a number of OFDM symbols that can be used for transmitting the PRS (that is, a number of target OFDM symbols) not rely on an LTE control region (always assuming that a largest LTE PDCCH region is used), and therefore is relatively simple.

Specifically, a terminal assumes that there is always LTE CRS transmission or there is always no LTE CRS transmission in the target subframe, or a base station indicates whether there is LTE CRS transmission in the target subframe.

For example, it is assumed that an indicator for indicating the same Physical Cell Identity (PCI) is set to True. When a valid subframe of the system is used for transmitting the PRS (that is, the target subframe is a valid subframe), because there is always LTE CRS transmission in the valid subframe in this case, the terminal device may always assume that there is LTE CRS transmission in the valid subframe. When an invalid subframe of the system is used for transmitting the PRS (that is, the target subframe is an invalid subframe), because there may be or may not be LTE CRS transmission in the invalid subframe in this case, the terminal device may always assume that there is or there is no LTE CRS transmission in the invalid subframe. Alternatively, whether there is LTE CRS transmission in the invalid subframe is indicated by using a network.

For another example, it is assumed that the indicator for indicating the same Physical Cell Identity (PCI) is set to False. When a valid subframe of the system is used for transmitting the PRS (that is, the target subframe is a valid subframe), because there may be or may not be LTE CRS transmission in the valid subframe in this case, the terminal device may always assume that there is or there is no LTE CRS transmission in the valid subframe. Alternatively, whether there is LTE CRS transmission in the valid subframe is indicated by using a network. When an invalid subframe of the system is used for transmitting the PRS (that is, the target subframe is an invalid subframe), because there may be or may not be LTE CRS transmission in the invalid subframe in this case, the terminal device may always assume that there is or there is no LTE CRS transmission in the invalid subframe. Alternatively, whether there is LTE CRS transmission in the invalid subframe is indicated by using a network.

In another alternative embodiment, for a standalone operation or a guard band operation, the target subframe is a valid subframe or an invalid subframe.

Specifically, when the target subframe is a valid subframe, the target OFDM symbol allowed for transmitting the PRS is an OFDM symbol that is in the target subframe and that is not used for transmitting an NRS, or is an OFDM symbol that is in the target subframe, whose index is greater than 0, and that is not used for transmitting an NRS. The former is beneficial to maximize a number of OFDM symbols that can be used for transmitting the PRS (that is, a number of target OFDM symbols), while the latter is beneficial to reuse an existing LTE PRS mapping pattern (because in an existing LTE PRS, the first OFDM symbol of each timeslot is not mapped to).

When the target subframe is an invalid subframe, the target OFDM symbols allowed for transmitting the PRS are all OFDM symbols in the target subframe or all OFDM symbols in the target subframe whose indexes are greater than 0. The former is beneficial to maximize a number of OFDM symbols that can be used for transmitting the PRS (that is, a number of target OFDM symbols), while the latter is beneficial to reuse an existing LTE PRS mapping pattern (because in an existing LTE PRS, the first OFDM symbol of each timeslot is not mapped to).

In another manner, the PRS may alternatively have at least one of the following characteristics: the PRS is not mapped to a resource element that is used for transmitting an NRS in the target subframe; the PRS is not mapped to a resource element that is used for transmitting an LTE CRS in the target subframe; or the PRS is not mapped to an LTE PDCCH region in the target subframe.

Optionally, the target subframe is a valid subframe or an invalid subframe.

For an in-band operation, if the target subframe is a valid subframe, the PRS is mapped to all resource elements in the target subframe that are not used as an LTE PDCCH region and that are not used for transmitting an LTE CRS or an NRS (that is, the PRS is not mapped to a resource element that is used as an LTE PDCCH region, is not mapped to a resource element that is used for transmitting an LTE CRS, and is not mapped to a resource element that is used for transmitting an NRS), or the PRS is mapped to all resource elements that are in OFDM symbols of the target subframe except the first three OFDM symbols and that are not used for transmitting an LTE CRS or an NRS (that is, the PRS is not mapped to the first three OFDM symbols, is not mapped to a resource element that is used for transmitting an LTE CRS, and is not mapped to a resource element that is used for transmitting an NRS). If the target subframe is an invalid subframe, the PRS is mapped to all resource elements in the target subframe that are not used as an LTE PDCCH region and that are not used for transmitting an LTE CRS (that is, the PRS is not mapped to a resource element that is used as an LTE PDCCH region and is not mapped to a resource element that is used for transmitting an LTE CRS), or the PRS is mapped to all resource elements that are in OFDM symbols of the target subframe except the first three OFDM symbols and that are not used for transmitting an LTE CRS (that is, the PRS is not mapped to the first three OFDM symbols, and is not mapped to a resource element that is used for transmitting an LTE CRS; in this case, a resource element occupied by the PRS is similar to that of a secondary synchronization signal).

For a standalone operation or a guard band operation, if the target subframe is a valid subframe, the PRS is mapped to all resource elements in the target subframe that are not used for transmitting an NRS (that is, the PRS is not mapped to a resource element that is used for transmitting an NRS), or the PRS is mapped to all resource elements that are in OFDM symbols of the target subframe except the first three OFDM symbols and that are not used for transmitting an NRS (that is, the PRS is not mapped to the first three OFDM symbols, and is not mapped to a resource element that is used for transmitting an NRS). If the target subframe is an invalid subframe, the PRS is mapped to all resource elements in the target subframe, or the PRS is mapped to all resource elements that are in OFDM symbols of the target subframe except the first three OFDM symbols (that is, the PRS is not mapped to the first three OFDM symbols).

It should be noted that for an in-band operation, a standalone operations, or a guard band operation, as an alternative, the target subframe may be only an invalid subframe of the system. When a valid subframe is used for transmitting the PRS, some terminal devices (for example, a terminal device with a low-version that does not support the PRS) may not be able to identify which valid subframes are used for transmitting the PRS. As a result, interference or mutual influence between PRS transmission and downlink data transmission of the terminal devices may be caused. In the method, it is limited that the target subframe is always an invalid subframe of the system, which facilitates completely avoiding mutual influence between PRS transmission and downlink data transmission of the terminal devices.

Optionally, a target narrowband in the transmission resource for the PRS may be determined based on the specified information in the following manner: determining, based on narrowband information, at least one target narrowband allowed for transmitting the PRS.

It should be noted that the foregoing target narrowband is a narrowband specially used for transmitting the PRS (there is no other downlink channel or signal transmission except PRS transmission), or is a narrowband used for both PRS transmission and other downlink channel or signal transmission.

Optionally, when there are more than one target narrowband, the PRS is transmitted in the more than one target narrowband in a frequency-hopping manner.

Optionally, a granularity of the frequency-hopping is an integer multiple of radio frames or subframes.

When the PRS is transmitted in a frequency-hopping manner, different target narrow bands for transmitting the PRS may share same subframe configuration information, or subframe configuration information of different target narrow bands for transmitting the PRS may be independently configured.

Optionally, if different target narrow bands for transmitting the PRS share the same subframe configuration information, and the subframe configuration information is an N×10 bitmap for indicating whether each of N×10 subframes in every N (an integer greater than 0) consecutive target radio frames is the target subframe, a granularity of the frequency-hopping includes an integer number of radio frames and a number of corresponding radio frames is equal to 1/10 of a number of bits of the subframe configuration information (that is, the number of radio frames corresponding to the granularity of the frequency-hopping is equal to N). This method ensures a small enough granularity of the frequency-hopping, and also ensures that numbers of target subframes for transmitting the PRS are the same in the different target narrow bands.

The transmission is performed in a frequency-hopping manner means that during the entire PRS transmission, a PRS is not transmitted in a fixed narrowband, that is, the PRS is transmitted in one narrowband within a time range that is equal to the granularity of the frequency-hopping, and may be transmitted in another narrowband within another time range that is equal to the granularity of the frequency-hopping. The granularity of the frequency-hopping refers to transmission duration of PRS in one narrowband before jumping to another narrowband for transmission, or refers to a physical time interval between a moment at which the PRS starts to be transmitted in one narrowband and a moment at which the PRS starts to be transmitted in another narrowband. This method is helpful for a receiver to obtain a frequency diversity gain, thereby improving PRS-based positioning performance or accuracy.

Optionally, a base station may instruct, by using a Msg2 message, a terminal to feed back position information.

Optionally, after receiving the Msg2 message, the terminal may feed back the position information in the following manner: when a random access process is triggered by Downlink Control Information (DCI), feeding back, by the terminal, the position information in a Msg3 message; or when a random access process is not triggered by Downlink Control Information (DCI), feeding back, by the terminal, the position information in a Msg5 message. The position information is fed back in the uplink message Msg3 or Msg5 during random access of the terminal device. This is helpful to further reduce a delay of feeding back the position information.

Optionally, in order to enable the terminal device to receive a PRS signal sent by a neighboring base station, the terminal may also obtain information about the neighboring base station from a serving base station. The information about the neighboring base station includes at least one of: information related to PRS transmission, configuration information of a valid subframe, an indicator for indicating the same PCI, an indication of whether there is LTE CRS transmission in the target subframe that is allowed for transmitting the PRS, or a size of the LTE PDCCH region. The PRS sent by the neighboring base station is received based on the information about the neighboring base station. Similar to acquiring a transmission resource and a mapping pattern for a PRS from the serving base station, by acquiring the foregoing parameters, the terminal device can obtain a transmission resource and a mapping pattern for a PRS from the neighboring base station, so that the terminal device can implement measurement on the PRS from the neighboring base station, which is helpful to better implement a positioning function.

Optionally, the offset $\Delta_{PRS}$ is used to indicate a deviation between a start location of the transmission resource for the PRS in the period $T_{PRS}$ and a start location of the period $T_{PRS}$, and a measurement unit of $\Delta_{PRS}$ is N subframes.

A specific value of N may be 40, 10, or 20.

Jointly encoding is performed on the period $T_{PRS}$ and $\Delta_{PRS}$, and values of the period $T_{PRS}$ and $\Delta_{PRS}$ are indicated by using an index $I_{PRS}$.

The duration T is used to indicate a length of a time domain occupied by the transmission resource for the PRS in the period.

The duration T includes at least one of:

K time lengths, where the time length is equal to M subframes, and

K and M are integers greater than or equal to 1.

Herein, the K time lengths are continuously distributed in a time domain.

A value of M may be equal to that of N.

The target subframes allowed for transmitting the PRS in the time length are determined according to the subframe configuration information.

The subframe configuration information is a bitmap of an L-bit length, and L is an integer greater than 0.

The length L is one of:

the length L is equal to M;

the length L is less than M;

the length L is less than M, and the length L is equal to a number of invalid subframes in the time length; or the length L is less than a number of invalid subframes in the time length.

Herein, in practical application, the valid subframe may include at least one of:

an available subframe informed by using signaling (for example, a system message);

a subframe in which no NPBCH exists;

a subframe in which no NPSS exists;

a subframe in which no NSSS exists; or a subframe in which an NPDSCH carrying an NSIB1 does not exist.

Certainly, a subframe other than the invalid subframe is defined as an invalid subframe.

In practical application, for a valid subframe, there may be another definition. Specifically, the valid subframe includes at least one of:

an available subframe informed by using signaling (for example, a system message).

Certainly, a subframe other than the invalid subframe is defined as an invalid subframe.

In practical application, for a valid subframe, there may be a third definition. Specifically, the valid subframe includes at least one of:

an available subframe informed by using signaling (for example, a system message).

A subframe other than the invalid subframe and the following subframe is defined as an invalid subframe:

a subframe in which no NPBCH exists;
a subframe in which no NPSS exists;
a subframe in which no NSSS exists; and
a subframe in which a Narrowband Physical Downlink Shared Channel (NPDSCH) carrying an NSIB1 does not exist.

When the length L is less than the number of invalid subframes in the time length (M subframes), the bitmap of an L-bit length indicates whether the first L invalid subframes of the invalid subframes in the time length (M subframes) are target subframes of the PRS, or the bitmap of an L-bit length indicates whether the last L invalid subframes of the invalid subframes in the time length (M subframes) are target subframes of the PRS.

The subframe configuration information of the K time lengths is the same.

In practical application, when the target subframe is a subframe for transmitting a specified channel or a specified signal, transmitting the PRS in the target subframe is not performed. The specified channel or the specified signal includes at least one of: an NPBCH, an NPSS, an NSSS, an NPDSCH carrying an NSIB1, or an NPDSCH carrying a narrowband System Information (SI) message.

When the target subframe is a subframe for transmitting a specified channel or a specified signal, transmitting the PRS in the target subframe is not performed, or data of the specified channel or the specified signal at a location of a resource element occupied by the PRS is punctured, where the specified channel or the specified signal includes at least one of: a NPDCCH, a non-broadcast NPDSCH, or a downlink channel or a downlink signal of an LTE system.

Narrow bands in which the transmission resources for the PRS in the K time lengths exist are determined according to a predetermined rule.

Herein, the predetermined rule may be at least one of:

transmission resources for the PRS in Q time lengths that are continuous in time domain are in the same narrowband, where Q is an integer greater than or equal to 1;

transmission resources for the PRS in two sets of Q time lengths adjacent to each other in time domain are located in different narrow bands; or transmission resources for the PRS in K time lengths are in the same narrowband.

The predetermined rule may further be at least one of:

the narrow bands in which the transmission resources for the PRS in the K time lengths exist are determined according to a formula $I_{NB,j} = \mathrm{mod}(j-1, N_{NB}^{PRS}) + 1$, where $N_{NB}^{PRS}$ is a number of the narrow bands in which the transmission resources for the PRS in the K time lengths exist, and $I_{NB,j}$ is an index of a narrowband, in $N_{NB}^{PRS}$ narrow bands, in which a transmission resource for the PRS in a $j^{th}$ time length exists;

the narrow bands in which the transmission resources for the PRS in the K time lengths exist are determined according to a formula $I_{NB,j} = \mathrm{mod}(j, N_{NB}^{PRS})$, where $N_{NB}^{PRS}$ is a number of the narrow bands in which the transmission resources for the PRS in the K time lengths exist, and $(I_{NB,j}+1)$ is an index of a narrowband, in $N_{NB}^{PRS}$ narrow bands, in which a transmission resource for the PRS in a $(j+1)^{th}$ time length exists; or the narrow bands in which the transmission resources for the PRS in the K time lengths exist are determined according to a formula $I_{NB,j} = \mathrm{mod}(\lfloor J/Q \rfloor, N_{NB}^{PRS})$, where $N_{NB}^{PRS}$ is a number of the narrow bands in which the transmission resources for the PRS in the K time lengths exist, $(I_{NB,j}+1)$ is an index of a narrowband, in $N_{NB}^{PRS}$ narrow bands, in which a transmission resource for the PRS in a $(j+1)^{th}$ time length exists, and Q is an integer greater than or equal to 1.

The specified information may further include at least one of:

transmit power configuration information of the PRS;
resource configuration information of an LTE PRS; or
transmit power configuration information of the LTE PRS.

The transmit power configuration information of the PRS is a deviation value between transmit power of the PRS and transmit power of a predetermined reference signal.

Herein, the predetermined reference signal may be at least one of:

an LTE PRS;
an LTE CRS; or
an NRS.

It should be noted that for an in-band operation, when there is LTE PRS transmission in a narrowband (that is, the target narrowband) for transmitting the PRS, a network may indicate information related to LTE PRS transmission in the narrowband to the terminal device, where the information related to LTE PRS transmission is used for the terminal device to determine a sequence and a transmission subframe of the LTE PRS in the narrowband. In this case, the terminal device can perform position measurement by using both a narrowband PRS and the LTE PRS, so as to further improve positioning accuracy and performance This embodiment of the application is detailed below with reference to specific implementations:

First Implementation

Jointly encoding is performed on the period ($T_{PRS}$) and the offset ($\Delta_{PRS}$) in the specified information related to PRS transmission.

Specifically, both the period ($T_{PRS}$) and the offset ($\Delta_{PRS}$) are determined by using a configuration index ($I_{PRS}$), as shown in Table 1.

The "configuration index" field includes 11 bits. A unit of the period ($T_{PRS}$) and the offset ($\Delta_{PRS}$) is a radio frame. A value of a PRS period that can be indicated is a power of 2, and possible values include {16, 32, 64, 128, 256, 512, 1024}. For a determined period ($T_{PRS}$), a value range of the offset ($\Delta_{PRS}$) that can be indicated is 0 to ($T_{PRS}-1$). For example, for period 64 ($T_{PRS}=64$), a value range of a corresponding offset is from 0 to 63.

TABLE 1

| Configuration index ($I_{PRS}$) | Period $T_{PRS}$ (radio frame) | Offset $\Delta_{PRS}$ (radio frame) |
|---|---|---|
| 0-15 | 16 | $I_{PRS}$ |
| 16-47 | 32 | $I_{PRS} - 16$ |

TABLE 1-continued

| Configuration index ($I_{PRS}$) | Period $T_{PRS}$ (radio frame) | Offset $\Delta_{PRS}$ (radio frame) |
|---|---|---|
| 48-111 | 64 | $I_{PRS} - 48$ |
| 112-239 | 128 | $I_{PRS} - 112$ |
| 240-495 | 256 | $I_{PRS} - 240$ |
| 496-1007 | 512 | $I_{PRS} - 496$ |
| 1008-2031 | 1024 | $I_{PRS} - 1008$ |
| 2032-2047 | Reserved | |

Second Implementation

Figure 3:
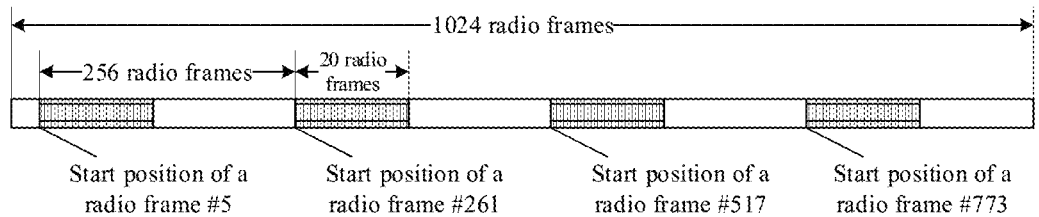
FIG. 3 is a schematic diagram of determining, based on a period, an offset, and duration, a target radio frame allowed for transmitting a PRS according to an embodiment of the disclosure.

FIG. 3 is a schematic diagram of determining, based on a period, an offset, and duration, a target radio frame allowed for transmitting a PRS.

If a configuration index ($I_{PRS}$) indicated by cell-specific signaling is equal to 245, a corresponding period ($T_{PRS}$) is equal to 256 radio frames, and a corresponding offset ($\Delta_{PRS}$) is equal to five (245-240) radio frames. Determining a start radio frame for transmitting a PRS according to the period ($T_{PRS}$) and the offset ($\Delta_{PRS}$) includes: a radio frame whose number meets the following equation is used as the start radio frame: $(n_f - 5) \bmod 256 = 0$, where $n_f$ indicates the number of the start radio frame for transmitting a PRS. If a number range of a radio frame is 0 to 1023, values of $n_f$ meeting the foregoing equation are 5, 261, 517, and 773. That is, four radio frames, numbered 5, 261, 517, and 773 respectively, are used as start radio frames for transmitting a PRS.

If PRS transmission duration ($N_{PRS}$) indicated by cell-specific signaling is equal to 20 radio frames, radio frames that can be finally used for PRS transmission (that is, target radio frames) are consecutive 20 radio frames starting from a radio frame #5, consecutive 20 radio frames starting from a radio frame #261, consecutive 20 radio frames starting from a radio frame #517, and consecutive 20 radio frames starting from a radio frame #773, as shown in FIG. 3. A radio frame # X indicates a radio frame numbered X.

If an available subframe configuration (that is, subframe configuration information) indicated by cell-specific signaling is a bitmap of a 10-bit length, it is used to indicate which subframes among 10 subframes (numbers 0 to 9) in a range of any radio frame that can be used for transmitting the PRS (that is, a target radio frame) are actually used for transmitting the PRS. For example, a value of the bitmap is 0100000110. In this case, a subframe #1, a subframe #7, and a subframe #8 (that is, three subframes) in the 10 subframes (numbers 0 to 9) in the range of any radio frame that can be used for transmitting the PRS are subframes actually used for transmitting the PRS (that is, target subframes). A subframe # X indicates a subframe numbered X.

Third Implementation

It is assumed that one subframe includes two timeslots, each timeslot includes seven consecutive OFDM symbols, an NB-IoT system works in an in-band operation mode, an indicator indicating whether Physical Cell Identity (PCI) is the same is set to "True", the first two OFDM symbols in the subframe are used as an LTE PDCCH region, a number of antenna ports for an NRS is 2, and a number of antenna ports for an LTE CRS is 2.

When a valid subframe of the system is used for transmitting the PRS (that is, a target subframe is the valid subframe), an OFDM symbol that can be used for transmitting the PRS (that is, a target OFDM symbol) is an OFDM symbol that is in the subframe and that is not used as an LTE PDCCH region and not used for transmitting an LTE CRS or an NRS, where a terminal device always assumes that there is always LTE CRS transmission in the valid subframe. In this case, the OFDM symbols that can be used for transmitting the PRS are specifically OFDM symbols whose indexes are 2 and 3 respectively in a first timeslot and OFDM symbols whose indexes are 1, 2 and 3 respectively in a second timeslot.

A resource element used for transmitting the PRS in the OFDM symbol that can be used for transmitting the PRS may be determined according to the following equation:

$$k = 6m + (6 - l + v_{shift}) \bmod 6$$

$$l = \begin{cases} 2, 3 & \text{if } n_s \bmod 2 = 0 \\ 1, 2, 3 & \text{if } n_s \bmod 2 = 1 \end{cases}$$

$$m = 0, 1$$

$$v_{shift} = N_{ID}^{Ncell} \bmod 6$$

k indicates an index of a resource element that is used for transmitting the PRS in the OFDM symbol that can be used for transmitting the PRS, l indicates an index of the OFDM symbol that can be used for transmitting the PRS, and $v_{shift}$ indicates a cell-specific frequency shift.

Figure 4:
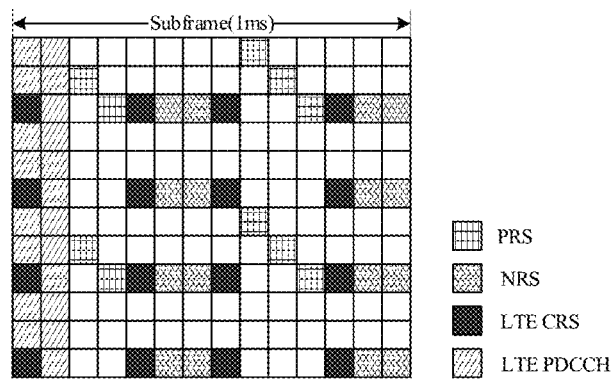
FIG. 4 is a schematic diagram of PRS resource mapping in an optional subframe according to an embodiment of the disclosure.

If $v_{shift}$ is equal to 0, resource elements for transmitting the PRS (also referred to as a PRS pattern) in different OFDM symbols that can be used for transmitting the PRS includes: resource elements whose indexes are 4 and 10 respectively in an OFDM symbol whose index is 2 in a first timeslot; resource elements whose indexes are 3 and 9 respectively in an OFDM symbol whose index is 3 in the first timeslot; resource elements whose indexes are 5 and 11 respectively in an OFDM symbol whose index is 1 in a second timeslot; resource elements whose indexes are 4 and 10 respectively in an OFDM symbol whose index is 2 in the second timeslot; and resource elements whose indexes are 3 and 9 respectively in an OFDM symbol whose index is 3 in the second timeslot, as shown in FIG. 4.

When an invalid subframe of the system is used for transmitting a PRS (that is, a target subframe is the invalid subframe), an OFDM symbol that can be used for transmitting the PRS (that is, a target OFDM symbol) is an OFDM symbol that is in the subframe and that is not used as an LTE PDCCH region and not used for transmitting an LTE CRS, where a terminal device assumes that there is always LTE CRS transmission or there is always no LTE CRS transmission in the invalid subframe; or it is indicated by using a network whether there is LTE CRS transmission in the invalid subframe. When the terminal device assumes that there is always LTE CRS transmission in the invalid subframe, or it is indicated by using the network that there is LTE CRS transmission in the invalid subframe, the OFDM symbols that can be used for transmitting the PRS are specifically 01-DM symbols whose indexes are 2, 3, 5 and 6 respectively in a first timeslot and OFDM symbols whose indexes are 1, 2, 3, 5 and 6 respectively in a second timeslot. When the terminal device assumes that there is always no LTE CRS transmission in the invalid subframe, or it is indicated by using the network that there is no LTE CRS transmission in the invalid subframe, the OFDM symbols that can be used for transmitting the PRS are specifically OFDM symbols whose indexes are 2, 3, 4, 5 and 6 respectively in a first timeslot and OFDM symbols whose indexes are 0, 1, 2, 3, 4, 5 and 6 respectively in a second timeslot. Mapping process of a resource element for transmitting the PRS is similar to that of a valid subframe used for transmitting the PRS, except that an index of an OFDM symbol for transmitting the PRS in each timeslot is different from that of the valid subframe for transmitting the PRS, and details are not described herein.

It should be noted that, different from a case in which the indicator indicating whether the PCI is the same is set to "True", when the indicator is set to "False", in addition to assuming that there is always LTE CRS transmission in the valid subframe, the terminal device may further assume that there is always no LTE CRS transmission in the valid subframe. Alternatively, it is indicated by using the network whether there is LTE CRS transmission in the valid subframe.

Fourth Implementation

It is assumed that one subframe includes two timeslots, each timeslot includes seven consecutive OFDM symbols, an NB-IoT system works in an in-band operation mode, an indicator indicating whether Physical Cell Identity (PCI) is the same is set to "True", the first two OFDM symbols in the subframe are used as an LTE PDCCH region, a number of antenna ports for an NRS is 2, and a number of antenna ports for an LTE CRS is 2.

When a valid subframe of the system is used for transmitting a PRS (that is, a target subframe is the valid subframe), an OFDM symbol that can be used for transmitting the PRS (that is, a target OFDM symbol) is an OFDM symbol that is in OFDM symbols of the subframe except the first three OFDM symbols and that is not used for transmitting an LTE CRS or an NRS, where a terminal device always assumes that there is always LTE CRS transmission in the valid subframe. In this case, the OFDM symbols that can be used for transmitting a PRS are specifically an OFDM symbol with an index of 3 in a first timeslot and OFDM symbols whose indexes are 1, 2, and 3 respectively in a second timeslot.

A resource element used for transmitting the PRS in the OFDM symbol that can be used for transmitting the PRS may be determined according to the following equation:

$$k = 6m + (6 - l + v_{shift}) \bmod 6$$
$$l = \begin{cases} 3 & \text{if } n_s \bmod 2 = 0 \\ 1, 2, 3 & \text{if } n_s \bmod 2 = 1 \end{cases}$$
$$m = 0, 1$$
$$v_{shift} = N_{ID}^{Ncell} \bmod 6$$

k indicates an index of a resource element that is used for transmitting the PRS in the OFDM symbol that can be used for transmitting the PRS, l indicates an index of the OFDM symbol that can be used for transmitting the PRS, and $v_{shift}$ indicates a cell-specific frequency shift.

Figure 5:
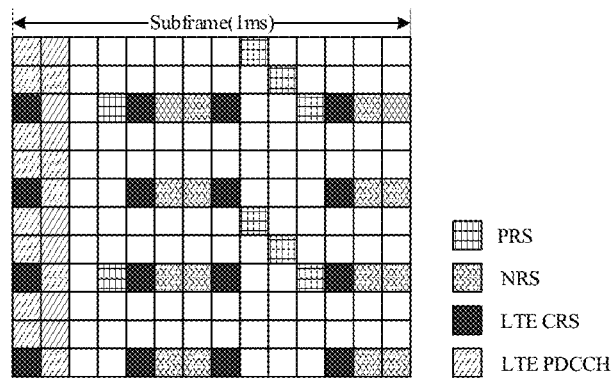
FIG. 5 is a schematic diagram of PRS resource mapping in an optional subframe according to an embodiment of the disclosure.

Assuming that $v_{shift}$ is equal to 0, resource elements used for transmitting the PRS (also referred to as a PRS pattern) in different OFDM symbols that can be used for transmitting the PRS include: resource elements whose indexes are 3 and 9 respectively in an OFDM symbol whose index is 3 in a first timeslot; resource elements whose indexes are 5 and 11 respectively in an OFDM symbol whose index is 1 in a second timeslot; resource elements whose indexes are 4 and 10 respectively in an OFDM symbol whose index is 2 in the second timeslot; and resource elements whose indexes are 3 and 9 respectively in an OFDM symbol whose index is 3 in the second timeslot, as shown in FIG. 5.

When an invalid subframe of the system is used for transmitting a PRS (that is, a target subframe is the invalid subframe), an OFDM symbol that can be used for transmitting the PRS (that is, a target OFDM symbol) is an OFDM symbol that is in OFDM symbols of the subframe except the first three OFDM symbols and that is not used for transmitting an LTE CRS, where a terminal device assumes that there is always LTE CRS transmission or there is always no LTE CRS transmission in the invalid subframe, or it is indicated by using a network whether there is LTE CRS transmission in the invalid subframe. When the terminal device assumes that there is always LTE CRS transmission in the invalid subframe, or it is indicated by using the network that there is LTE CRS transmission in the invalid subframe, the OFDM symbols that can be used for transmitting the PRS are specifically OFDM symbols whose indexes are 3, 5, and 6 respectively in a first timeslot and OFDM symbols whose indexes are 1, 2, 3, 5, and 6 respectively in a second timeslot. When the terminal device assumes that there is always no LTE CRS transmission in the invalid subframe, or it is indicated by using the network that there is no LTE CRS transmission in the invalid subframe, the OFDM symbols that can be used for transmitting the PRS are specifically OFDM symbols whose indexes are 3, 4, 5, and 6 respectively in a first timeslot and OFDM symbols whose indexes are 0, 1, 2, 3, 4, 5, and 6 respectively in a second timeslot. Mapping process of a resource element for transmitting the PRS is similar to that of a valid subframe for transmitting the PRS, except that an index of an OFDM symbol for transmitting the PRS in each timeslot is different from that of the valid subframe for transmitting the PRS, and details are not described herein.

It should be noted that, different from a case in which the indicator indicating whether the PCI is the same is set to "True", when the indicator is set to "False", in addition to assuming that there is always LTE CRS transmission in the valid subframe, the terminal device may further assume that there is always no LTE CRS transmission in the valid subframe. Alternatively, it is indicated by using the network whether there is LTE CRS transmission in the valid subframe.

Fifth Implementation

It is assumed that one subframe includes two timeslots, each timeslot includes seven consecutive OFDM symbols, an NB-IoT system works in an in-band operation mode, an indicator indicating whether Physical Cell Identity (PCI) is the same is set to "True", the first two OFDM symbols in the subframe are used as an LTE PDCCH region, a number of antenna ports for an NRS is 2, and a number of antenna ports for an LTE CRS is 4.

When a valid subframe of the system is used for transmitting a PRS (that is, a target subframe is the valid subframe), an OFDM symbol that can be used for transmitting the PRS (that is, a target OFDM symbol) is an OFDM symbol that is in the subframe and that is not used as an LTE PDCCH region and not used for transmitting an LTE CRS or an NRS, where a terminal device always assumes that there is always LTE CRS transmission in the valid subframe. In this case, the OFDM symbols that can be used for transmitting the PRS are specifically OFDM symbols whose indexes are 2 and 3 respectively in a first timeslot and OFDM symbols whose indexes are 2 and 3 respectively in a second timeslot.

A resource element used for transmitting the PRS in the OFDM symbol that can be used for transmitting the PRS may be determined according to the following equation:

$$k = 6m + (6 - l + v_{shift}) \bmod 6$$

$$l = \begin{cases} 2, 3 \text{ if } n_s \bmod 2 = 0 \\ 2, 3 \text{ if } n_s \bmod 2 = 1 \end{cases}$$

$$m = 0, 1$$

$$v_{shift} = N_{ID}^{Ncell} \bmod 6$$

k indicates an index of a resource element that is used for transmitting the PRS in the OFDM symbol that can be used for transmitting the PRS, l indicates an index of the OFDM symbol that can be used for transmitting the PRS, and $v_{shift}$ indicates a cell-specific frequency shift.

Figure 6:
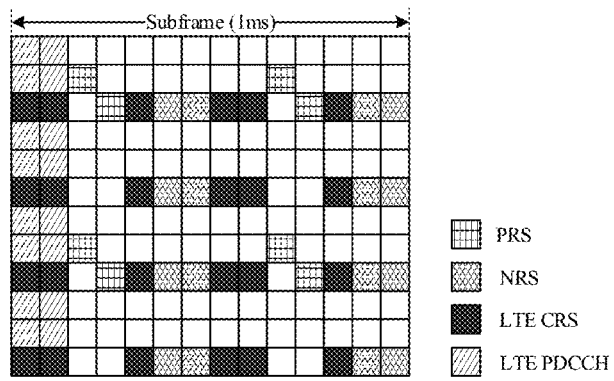
FIG. 6 is a schematic diagram of PRS resource mapping in an optional subframe according to an embodiment of the disclosure.

Assuming that $v_{shift}$ is equal to 0, resource elements used for transmitting the PRS (also referred to as a PRS pattern) in different OFDM symbols that can be used for transmitting the PRS include: resource elements whose indexes are 4 and 10 respectively in an OFDM symbol whose index is 2 in a first timeslot; resource elements whose indexes are 3 and 9 respectively in an OFDM symbol whose index is 3 in the first timeslot; resource elements whose indexes are 4 and 10 respectively in an OFDM symbol whose index is 2 in a second timeslot; and resource elements whose indexes are 3 and 9 respectively in an OFDM symbol whose index is 3 in the second timeslot, as shown in FIG. 6.

When an invalid subframe of the system is used for transmitting a PRS (that is, a target subframe is the invalid subframe), an OFDM symbol that can be used for transmitting the PRS (that is, a target OFDM symbol) is an OFDM symbol that is in the subframe and that is not used as an LTE PDCCH region and not used for transmitting an LTE CRS, where a terminal device assumes that there is always LTE CRS transmission or there is always no LTE CRS transmission in the invalid subframe, or it is indicated by using a network whether there is LTE CRS transmission in the invalid subframe. When the terminal device assumes that there is always LTE CRS transmission in the invalid subframe, or it is indicated by using the network that there is LTE CRS transmission in the invalid subframe, the OFDM symbols that can be used for transmitting the PRS are specifically 01-DM symbols whose indexes are 2, 3, 5, and 6 respectively in a first timeslot and OFDM symbols whose indexes are 2, 3, 5, and 6 respectively in a second timeslot. When the terminal device assumes that there is always no LTE CRS transmission in the invalid subframe, or it is indicated by using the network that there is no LTE CRS transmission in the invalid subframe, the OFDM symbols that can be used for transmitting the PRS are specifically OFDM symbols whose indexes are 2, 3, 4, 5, and 6 respectively in a first timeslot and OFDM symbols whose indexes are 0, 1, 2, 3, 4, 5, and 6 respectively in a second timeslot. Mapping process of a resource element for transmitting the PRS is similar to that of a valid subframe for transmitting the PRS, except that an index of an OFDM symbol for transmitting the PRS in each timeslot is different from that of the valid subframe for transmitting the PRS, and details are not described herein.

It should be noted that, different from a case in which the indicator indicating whether the PCI is the same is set to "True", when the indicator is set to "False", in addition to assuming that there is always LTE CRS transmission in the valid subframe, the terminal device may further assume that there is always no LTE CRS transmission in the valid subframe. Alternatively, it is indicated by using the network whether there is LTE CRS transmission in the valid subframe.

Sixth Implementation

It is assumed that one subframe includes two timeslots, each timeslot includes seven consecutive OFDM symbols, an NB-IoT system works in an in-band operation mode, an indicator indicating whether Physical Cell Identity (PCI) is the same is set to "True", the first two OFDM symbols in the subframe are used as an LTE PDCCH region, a number of antenna ports for an NRS is 2, and a number of antenna ports for an LTE CRS is 4.

When a valid subframe of the system is used for transmitting a PRS (that is, a target subframe is the valid subframe), an OFDM symbol that can be used for transmitting the PRS (that is, a target OFDM symbol) is an OFDM symbol that is in OFDM symbols of the subframe except the first three OFDM symbols and that is not used for transmitting an LTE CRS or an NRS, where a terminal device always assumes that there is always LTE CRS transmission in the valid subframe. In this case, the OFDM symbols that can be used for transmitting the PRS are specifically an OFDM symbol with an index of 3 in a first timeslot and OFDM symbols whose indexes are 2 and 3 respectively in a second timeslot.

A resource element used for transmitting the PRS in the OFDM symbol that can be used for transmitting the PRS may be determined according to the following equation:

$$k = 6m + (6 - l + v_{shift}) \bmod 6$$

$$l = \begin{cases} 3 \text{ if } n_s \bmod 2 = 0 \\ 2, 3 \text{ if } n_s \bmod 2 = 1 \end{cases}$$

$$m = 0, 1$$

$$v_{shift} = N_{ID}^{Ncell} \bmod 6$$

k indicates an index of a resource element that is used for transmitting the PRS in the OFDM symbol that can be used for transmitting the PRS, l indicates an index of the OFDM symbol that can be used for transmitting the PRS, and vhf indicates a cell-specific frequency shift.

Figure 7:
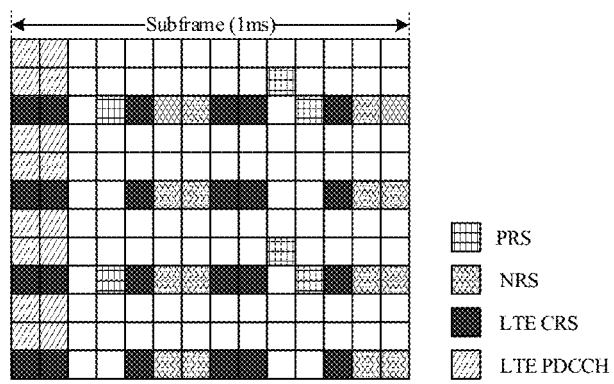
FIG. 7 is a schematic diagram of PRS resource mapping in an optional subframe according to an embodiment of the disclosure.

Assuming that vhf is equal to 0, resource elements used for transmitting the PRS (also referred to as a PRS pattern) in different OFDM symbols that can be used for transmitting the PRS include: resource elements whose indexes are 3 and 9 respectively in an OFDM symbol whose index is 3 in a first timeslot; resource elements whose indexes are 4 and 10 respectively in an OFDM symbol whose index is 2 in a second timeslot; and resource elements whose indexes are 3 and 9 respectively in an OFDM symbol whose index is 3 in the second timeslot, as shown in FIG. 7.

When an invalid subframe of the system is used for transmitting a PRS (that is, a target subframe is the invalid subframe), an OFDM symbol that can be used for transmitting the PRS (that is, a target OFDM symbol) is an OFDM symbol that is in OFDM symbols of the subframe except the first three OFDM symbols and that is not used for transmitting an LTE CRS, where a terminal device assumes that there is always LTE CRS transmission or there is always no LTE CRS transmission in the invalid subframe; or it is indicated by using a network whether there is LTE CRS transmission in the invalid subframe. When the terminal device assumes that there is always LTE CRS transmission in the invalid subframe, or it is indicated by using the network that there is LTE CRS transmission in the invalid subframe, the OFDM symbols that can be used for transmitting the PRS are specifically OFDM symbols whose indexes are 3, 5, and 6 respectively in a first timeslot and OFDM symbols whose indexes are 2, 3, 5, and 6 respectively in a second timeslot. When the terminal device assumes that there is always no LTE CRS transmission in the invalid subframe, or it is indicated by using the network that there is no LTE CRS transmission in the invalid subframe, the OFDM symbols that can be used for transmitting the PRS are specifically 01-DM symbols whose indexes are 3, 4, 5, and 6 respectively in a first timeslot and OFDM symbols whose indexes are 0, 1, 2, 3, 4, 5, and 6 respectively in a second timeslot. Mapping process of a resource element for transmitting the PRS is similar to that of a valid subframe for transmitting the PRS, except that an index of an OFDM symbol for transmitting the PRS in each timeslot is different from that of the valid subframe for transmitting the PRS, and details are not described herein.

It should be noted that, different from a case in which the indicator indicating whether the PCI is the same is set to "True", when the indicator is set to "False", in addition to assuming that there is always LTE CRS transmission in the valid subframe, the terminal device may further assume that there is always no LTE CRS transmission in the valid subframe. Alternatively, it is indicated by using the network whether there is LTE CRS transmission in the valid subframe.

Seventh Implementation

It is assumed that one subframe includes two timeslots, each timeslot includes seven consecutive OFDM symbols, an NB-IoT system works in a Standalone or Guard band operation mode, and a number of antenna ports for an NRS is 2.

When a valid subframe of the NB-IoT system is used for transmitting a PRS (that is, a target subframe is the valid subframe), an OFDM symbol that can be used for transmitting the PRS (that is, a target OFDM symbol) is an OFDM symbol that is in the subframe and that is not used for transmitting an NRS. The OFDM symbols that can be used for transmitting the PRS are specifically OFDM symbols whose indexes are 0, 1, 2, 3, and 4 respectively in a first timeslot and OFDM symbols whose indexes are 0, 1, 2, 3, and 4 respectively in a second timeslot.

A resource element used for transmitting the PRS in the OFDM symbol that can be used for transmitting the PRS may be determined according to the following equation:

$$k = 6m + (6 - l + v_{shift}) \bmod 6$$
$$l = \begin{cases} 0, 1, 2, 3, 4 \text{ if } n_s \bmod 2 = 0 \\ 0, 1, 2, 3, 4 \text{ if } n_s \bmod 2 = 1 \end{cases}$$
$$m = 0, 1$$
$$v_{shift} = N_{ID}^{Ncell} \bmod 6$$

k indicates an index of a resource element that is used for transmitting the PRS in the OFDM symbol that can be used for transmitting the PRS, l indicates an index of the OFDM symbol that can be used for transmitting the PRS, and $v_{shift}$ indicates a cell-specific frequency shift.

Figure 8:
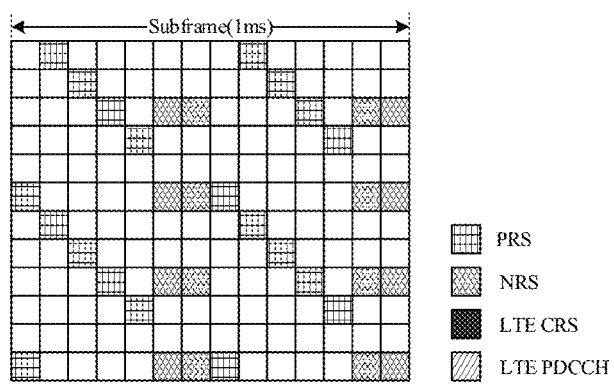
FIG. 8 is a schematic diagram of PRS resource mapping in an optional subframe according to an embodiment of the disclosure.

Assuming that $v_{shift}$ is equal to 0, resource elements used for transmitting the PRS (also referred to as a PRS pattern) in different OFDM symbols that can be used for transmitting the PRS include: resource elements whose indexes are 0 and 6 respectively in OFDM symbols whose indexes are 0 in a first timeslot and a second timeslot; resource elements whose indexes are 5 and 11 respectively in OFDM symbols whose indexes are 1 in the first timeslot and the second timeslot; resource elements whose indexes are 4 and 10 respectively in OFDM symbols whose indexes are 2 in the first timeslot and the second timeslot; resource elements whose indexes are 3 and 9 respectively in OFDM symbols whose indexes are 3 in the first timeslot and the second timeslot; and resource elements whose indexes are 2 and 8 respectively in OFDM symbols whose indexes are 4 in the first timeslot and the second timeslot, as shown in FIG. 8.

When an invalid subframe of the system is used for transmitting a PRS (that is, a target subframe is the invalid subframe), OFDM symbols that can be used for transmitting the PRS (that is, a target OFDM symbol) are all OFDM symbols in the subframe, which are specifically OFDM symbols whose indexes are 0, 1, 2, 3, 4, 5, and 6 respectively in a first timeslot and OFDM symbols whose indexes are 0, 1, 2, 3, 4, 5, and 6 respectively in a second timeslot. Mapping process of a resource element for transmitting the PRS is similar to that of a valid subframe for transmitting the PRS, except that an index of an OFDM symbol for transmitting the PRS in each timeslot is different from that of the valid subframe for transmitting the PRS, and details are not described herein.

Eighth Implementation

It is assumed that one subframe includes two timeslots, each timeslot includes seven consecutive OFDM symbols, an NB-IoT system works in a Standalone or Guard band operation mode, and a number of antenna ports for an NRS is 2.

When a valid subframe of the NB-IoT system is used for transmitting a PRS (that is, a target subframe is the valid subframe), OFDM symbols that can be used for transmitting the PRS (that is, target OFDM symbols) are OFDM symbols that are in the subframe, whose indexes are greater than 0, and that are not used for transmitting an NRS, which are specifically OFDM symbols whose indexes are 1, 2, 3, and 4 respectively in a first timeslot and OFDM symbols whose indexes are 1, 2, 3, and 4 respectively in a second timeslot.

A resource element used for transmitting the PRS in the OFDM symbol that can be used for transmitting the PRS may be determined according to the following equation:

$$k = 6m + (6 - l + v_{shift}) \bmod 6$$
$$l = \begin{cases} 1, 2, 3, 4 \text{ if } n_s \bmod 2 = 0 \\ 1, 2, 3, 4 \text{ if } n_s \bmod 2 = 1 \end{cases}$$
$$m = 0, 1$$
$$v_{shift} = N_{ID}^{Ncell} \bmod 6$$

k indicates an index of a resource element that is used for transmitting the PRS in the OFDM symbol that can be used for transmitting the PRS, l indicates an index of the OFDM symbol that can be used for transmitting the PRS, and $v_{shift}$ indicates a cell-specific frequency shift.

Figure 9:
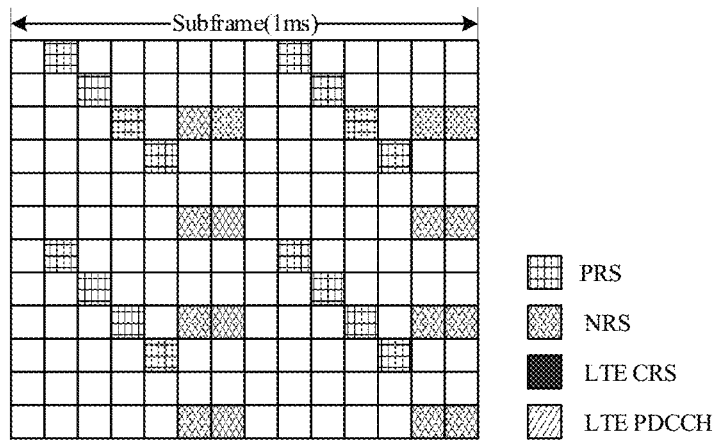
FIG. 9 is a schematic diagram of PRS resource mapping in an optional subframe according to an embodiment of the disclosure.

Assuming that $v_{shift}$ is equal to 0, resource elements used for transmitting the PRS (also referred to as a PRS pattern) in different OFDM symbols that can be used for transmitting the PRS include: resource elements whose indexes are 5 and 11 respectively in OFDM symbols whose indexes are 1 in a first timeslot and a second timeslot; resource elements whose indexes are 4 and 10 respectively in OFDM symbols whose indexes are 2 in the first timeslot and the second timeslot; resource elements whose indexes are 3 and 9 respectively in OFDM symbols whose indexes are 3 in the first timeslot and the second timeslot; and resource elements whose indexes are 2 and 8 respectively in OFDM symbols whose indexes are 4 in the first timeslot and the second timeslot, as shown in FIG. 9.

When an invalid subframe of the system is used for transmitting a PRS (that is, a target subframe is the invalid subframe), OFDM symbols that can be used for transmitting the PRS (that is, target OFDM symbols) are all OFDM symbols whose indexes are greater than 0 in the subframe, which are specifically OFDM symbols whose indexes are 1, 2, 3, 4, 5, and 6 respectively in a first timeslot and OFDM symbols whose indexes are 1, 2, 3, 4, 5, and 6 respectively in a second timeslot. Mapping process of a resource element for transmitting the PRS is similar to that of a valid subframe for transmitting the PRS, except that an index of an OFDM symbol for transmitting the PRS in each timeslot is different from that of the valid subframe for transmitting the PRS, and details are not described herein.

Ninth Implementation

It is assumed that an NB-IoT system supports multiple narrow bands and that four narrow bands are configured for transmitting a PRS. In a range of one PRS transmission period, transmission duration of the PRS is M*N radio frames, where M and N are integers greater than 0.

Figure 10:
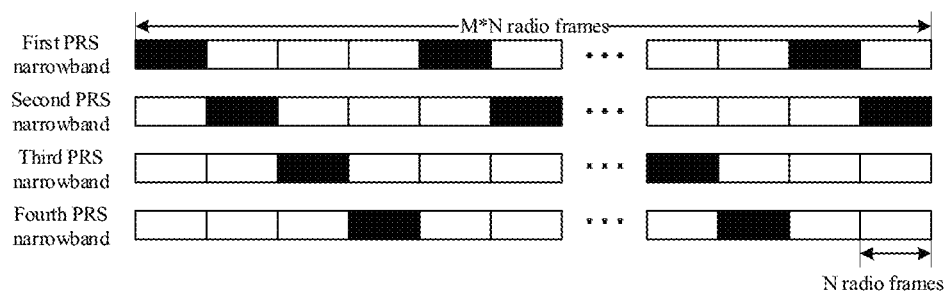
FIG. 10 is a schematic diagram of an optional PRS frequency-hopping transmission according to an embodiment of the disclosure.

The PRS is transmitted in the four narrow bands in a frequency-hopping manner, as shown in FIG. 10. A granularity of the frequency-hopping is N radio frames. Specifically, every N consecutive radio frames in M*N consecutive radio frames form one group, and there are a total of M radio frame groups whose numbers are {0,1, 2, ..., m, ..., M−1}, respectively. For a radio frame group whose number is divided by 4 to obtain a remainder (m mod 4) 0, a first narrowband is used for transmitting the PRS. For a radio frame group whose number is divided by 4 to obtain a remainder 1, a second narrowband is used for transmitting the PRS. For a radio frame group whose number is divided by 4 to obtain a remainder 2, a third narrowband is used for transmitting the PRS. For a radio frame group whose number is divided by 4 to obtain a remainder 3, a fourth narrowband is used for transmitting the PRS.

Tenth Implementation

In the third implementation to the eighth implementation, two resource elements for transmitting a PRS in an OFDM symbol (that is, a target OFDM symbol) that can be used for transmitting the PRS rely on a Physical Cell Identity (PCI) ($N_{ID}^{Ncell}$) and an index of the OFDM symbol (1), where the PCI is used to determine a frequency shift ($v_{shift}$) in a resource element mapping process according to the following equation: $v_{shift} = N_{ID}^{Ncell} \bmod 6$.

In this implementation, it should be further noted that, vhf may alternatively be determined according to one of the following equations.

$$v_{shift} = f(N_{ID}^{Ncell}, \lfloor \lfloor n_s/2 \rfloor / K_{SF} \rfloor) \bmod 6, \quad (1)$$

$$v_{shift} = f(N_{ID}^{Ncell}, \lfloor (10n_f + n_s/2) \rfloor / K_{SF} \rfloor) \bmod 6, \quad (2)$$

$$v_{shift} = f(N_{ID}^{Ncell}, \lfloor n_f / K_{SF} \rfloor) \bmod 6. \quad (3)$$

$n_f$ indicates a physical radio frame index (a value range is from 0 to 1023), or indicates a logical radio frame index specifically used for transmitting the PRS (it is assumed that an index of a first radio frame in a range of each PRS transmission period (a start radio frame for transmitting the PRS) is 0, as shown in FIG. 3, logical radio frame indexes corresponding to radio frames whose physical radio frame indexes are 5, 261, 517, and 773 respectively are all 0); $n_s$ indicates a timeslot index in a radio frame, "$\lfloor \cdot \rfloor$" indicates a round-down operation, "$\lfloor n_s/2 \rfloor$" is corresponding to a subframe index in the radio frame; $K_{SF}$ and $K_{RF}$ are integers greater than 0 that respectively indicate the number of subframes and the number of radio frames in which $v_{shift}$ keeps unchanged; f(x,y) indicates a function/mapping in which x and y are used as input parameters (for example, a random number is determined based on x and y), where a value of f(x,y) is an integer greater than or equal to 0.

For the equation (1), in addition to the PCI, vhf further relies on the subframe index, that is, a resource element for transmitting a PRS relies on the PCI, the subframe index, and the OFDM symbol index. For the equation (2), in addition to the PCI, vhf further relies on the radio frame index and the subframe index, that is, a resource element for transmitting a PRS relies on the PCI, the radio frame index, the subframe index, and the OFDM symbol index. For the equation (3), in addition to the PCI, vhf further relies on the radio frame index, that is, a resource element for transmitting a PRS relies on the PCI, the radio frame index, and the OFDM symbol index.

When P (an integer greater than 1) narrow bands are used for PRS transmission (for example, a PRS is transmitted in the P narrow bands in a frequency-hopping manner), $v_{shift}$ may further rely on a narrowband index. Specifically, $v_{shift}$ may be determined according to one of the following equations.

$$v_{shift} = f(N_{ID}^{Ncell}, p) \bmod 6;$$

$$v_{shift} = f(N_{ID}^{Ncell}, \lfloor \lfloor n_s/2 \rfloor / K_{SF} \rfloor, p) \bmod 6;$$

$$v_{shift} = f(N_{ID}^{Ncell}, \lfloor (10n_f + \lfloor n_s/2 \rfloor) / K_{SF} \rfloor, p) \bmod 6;$$

$$v_{shift} = f(N_{ID}^{Ncell}, \lfloor n_f / K_{RF} \rfloor, p) \bmod 6.$$

$n_f$ indicates a physical radio frame index (a value range is from 0 to 1023), or indicates a logical radio frame index specifically used for transmitting the PRS (it is assumed that an index of a first radio frame in a range of each PRS transmission period (a start radio frame for transmitting the PRS) is 0, for example, as shown in FIG. 3, logical radio frame indexes corresponding to radio frames whose physical radio frame indexes are 5, 261, 517, and 773 respectively are all 0); $n_s$ indicates a timeslot index in a radio frame, "$\lfloor \cdot \rfloor$" indicates a round-down operation, "$\lfloor n_s/2 \rfloor$" is corresponding to a subframe index in the radio frame; $K_{SF}$ and $K_{RF}$ are integers greater than 0 that respectively indicate the number of subframes and the number of radio frames in which $v_{shift}$ keeps unchanged; f(x,y) indicates a function/mapping in which x and y are used as input parameters (for example, a random number is determined based on x and y); f(x,y,z)

indicates a function/mapping in which x, y and z are used as input parameters (for example, a random number is determined based on x, y and z), where a value of f(x,y,z) is an integer greater than or equal to 0; and p indicates a logical index of a narrowband for PRS transmission, and a value range is from 0 to P-1.

Eleventh Implementation

In a narrowband communications system, jointly encoding is performed on a transmission period $T_{PRS}$ and a transmission offset $\Delta_{PRS}$ of a transmission resource for a PRS, and the transmission period $T_{PRS}$ and the transmission offset $\Delta_{PRS}$ are indicated by using an index $I_{PRS}$. The offset $\Delta_{PRS}$ is used to indicate a deviation between a start location of the transmission resource for the PRS in the period $T_{PRS}$ and a start location of the period $T_{PRS}$ and a measurement unit of $\Delta_{PRS}$ is 40 subframes.

A value of $I_{PRS}$ is shown in Table 2, and is described by using 10 bits.

TABLE 2

| $I_{PRS}$ | $T_{PRS}$ (Measurement unit: subframe) | $\Delta_{PRS}$ (Measurement unit: 40 subframes) |
|---|---|---|
| 0-3 | 160 | $I_{PRS}$ |
| 4-11 | 320 | $I_{PRS} - 4$ |
| 12-27 | 640 | $I_{PRS} - 12$ |
| 28-59 | 1280 | $I_{PRS} - 28$ |
| 60-123 | 2560 | $I_{PRS} - 60$ |
| 124-251 | 5120 | $I_{PRS} - 124$ |
| 252-507 | 10240 | $I_{PRS} - 252$ |
| 508-1019 | 20480 | $I_{PRS} - 508$ |
| 1020-1023 | Reserved | |

Figure 12:
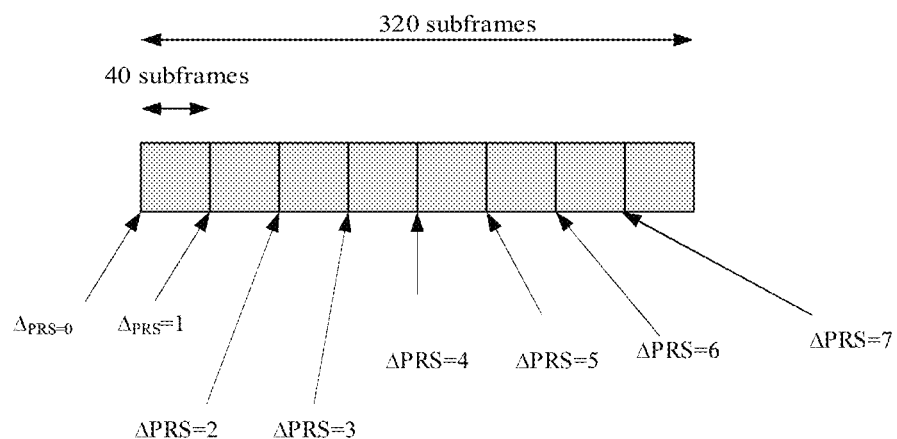
FIG. 12 is a schematic diagram of PRS resource mapping in an optional subframe according to an embodiment of the disclosure.

In this embodiment, if $I_{PRS}$ is 5, it indicates that $T_{PRS}$ is configured to be 320 subframes, and $\Delta_{PRS}=I_{PRS}$ 4=1, which indicates that the deviation between the start location of the transmission resource for the PRS in the period $T_{PRS}$ and the start location of the period $T_{PRS}$ is 40 subframes, as shown in FIG. 12.

In another embodiment, a value of $I_{PRS}$ is shown in Table 3, and is described by using 8 bits.

TABLE 3

| $I_{PRS}$ | $T_{PRS}$ (Measurement unit: subframe) | $\Delta_{PRS}$ (Measurement unit: 40 subframes) |
|---|---|---|
| 0-3 | 160 | $I_{PRS}$ |
| 4-11 | 320 | $I_{PRS} - 4$ |
| 12-27 | 640 | $I_{PRS} - 12$ |
| 28-59 | 1280 | $I_{PRS} - 28$ |
| 60-123 | 2560 | $I_{PRS} - 60$ |
| 124-251 | 5120 | $I_{PRS} - 124$ |
| 252-255 | Reserved | |

In another embodiment, a value of $I_{PRS}$ is shown in Table 4, and is described by using 9 bits.

TABLE 4

| $I_{PRS}$ | $T_{PRS}$ (Measurement unit: subframe) | $\Delta_{PRS}$ (Measurement unit: 40 subframes) |
|---|---|---|
| 0-3 | 160 | $I_{PRS}$ |
| 4-11 | 320 | $I_{PRS} - 4$ |
| 12-27 | 640 | $I_{PRS} - 12$ |
| 28-59 | 1280 | $I_{PRS} - 28$ |
| 60-123 | 2560 | $I_{PRS} - 60$ |
| 124-251 | 5120 | $I_{PRS} - 124$ |
| 252-507 | 10240 | $I_{PRS} - 252$ |
| 508-511 | Reserved | |

Twelfth Implementation

In a narrowband communications system, jointly encoding is performed on a transmission period $T_{PRS}$ and a transmission offset $\Delta_{PRS}$ of a transmission resource for a PRS, and the transmission period $T_{PRS}$ and the transmission offset $\Delta_{PRS}$ are indicated by using an index $I_{PRS}$. The offset $\Delta_{PRS}$ is used to indicate a deviation between a start location of the transmission resource for the PRS in the period $T_{PRS}$ and a start location of the period $T_{PRS}$ and a measurement unit of $\Delta_{PRS}$ is 40 subframes.

A value of $I_{PRS}$ is shown in Table 2, and is described by using 10 bits.

Figure 13:
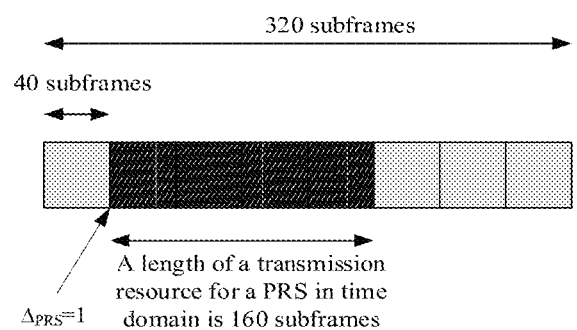
FIG. 13 is a schematic diagram of PRS resource mapping in an optional subframe according to an embodiment of the disclosure.

In this embodiment, if $I_{PRS}$ is 5, it indicates that $T_{PRS}$ is configured to be 320 subframes, and $\Delta_{PRS}=I_{PRS}$ 4=1, which indicates that the deviation between the start location of the transmission resource for the PRS in the period $T_{PRS}$ and the start location of the period $T_{PRS}$ is 40 subframes, as shown in FIG. 13.

A time domain length occupied by the transmission resource for the PRS in the period $T_{PRS}$ is T, and T includes K time lengths. The time length is equal to M subframes.

In this embodiment, if M=40, K=4, and K time lengths are continuously distributed in a time domain, the time domain length T occupied by the transmission resource for the PRS in the period $T_{PRS}$ is 160 subframes, as shown in FIG. 13.

Target subframes, allowed for transmitting the PRS, in the time length is determined according to subframe configuration information. In this embodiment, the subframe configuration information is a bitmap of a 40-bit length. A bit "1" represents that a corresponding subframe is the target subframe of the PRS, while a bit "0" represents that a corresponding subframe is not the target subframe of the PRS. In this embodiment, the bitmap of a 40-bit length is {1, 1, 1, 1, 1, 0, 0, 0, 0, 0, 1, 1, 1, 1, 1, 0, 0, 0, 0, 0, 1, 1, 1, 1, 1, 0, 0, 0, 0, 0, 1, 1, 1, 1, 1, 0, 0, 0, 0, 0}. In this embodiment, the subframe configuration information of the four time lengths is the same.

Thirteenth Implementation

In a narrowband communications system, jointly encoding is performed on a transmission period $T_{PRS}$ and a transmission offset $\Delta_{PRS}$ of a transmission resource for a PRS, and the transmission period $T_{PRS}$ and the transmission offset $\Delta_{PRS}$ are indicated by using an index $I_{PRS}$. The offset $\Delta_{PRS}$ is used to indicate a deviation between a start location of the transmission resource for the PRS in the period $T_{PRS}$ and a start location of the period $T_{PRS}$ and a measurement unit of $\Delta_{PRS}$ is 40 subframes.

A value of $I_{PRS}$ is shown in Table 2, and is described by using 10 bits.

Figure 14:
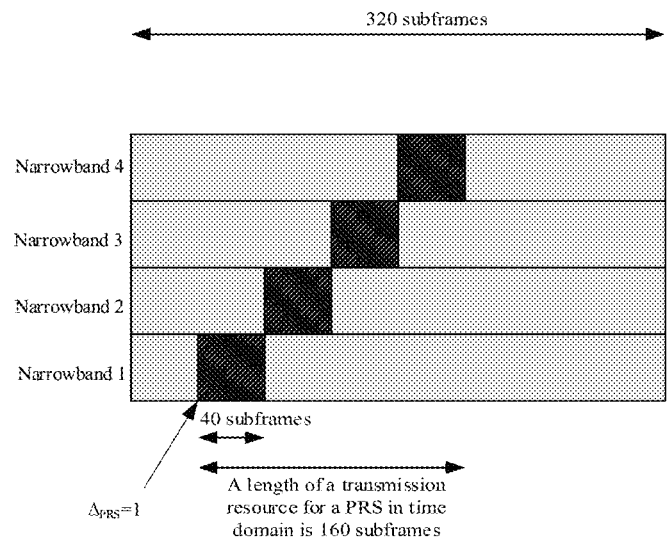
FIG. 14 is a schematic diagram of PRS resource mapping in an optional subframe according to an embodiment of the disclosure.

In this embodiment, if $I_{PRS}$ is 5, it indicates that $T_{PRS}$ is configured to be 320 subframes, and $\Delta_{PRS}=I_{PRS}$ 4=1, which indicates that the deviation between the start location of the transmission resource for the PRS in the period $T_{PRS}$ and the start location of the period $T_{PRS}$ is 40 subframes, as shown in FIG. 14.

A time domain length occupied by the transmission resource for the PRS in the period $T_{PRS}$ is T, and T includes K time lengths. The time length is equal to M subframes.

In this embodiment, if M=40, K=4, and K time lengths are continuously distributed in a time domain, the time domain length T occupied by the transmission resource for the PRS in the period $T_{PRS}$ is 160 subframes, as shown in FIG. 14.

Target subframes, allowed for transmitting the PRS, in the time length are determined according to subframe configuration information. In this embodiment, the subframe configuration information is a bitmap of a 40-bit length. A bit "1" represents that a corresponding subframe is the target subframe of the PRS, while a bit "0" represents that a corresponding subframe is not the target subframe of the PRS. In this embodiment, the bitmap of a 40-bit length is {1, 1, 1, 1, 1, 0, 0, 0, 0, 0, 1, 1, 1, 1, 1, 0, 0, 0, 0, 0, 1, 1, 1, 1, 1, 0, 0, 0, 0, 0, 1, 1, 1, 1, 1, 0, 0, 0, 0, 0}. In this embodiment, the subframe configuration information of the four time lengths is the same.

In this embodiment, narrow bands in which the transmission resources for the PRS in the four time lengths exist are determined according to a formula $I_{NB}=\mathrm{mod}(j-1, N_{NB}^{PRS})+1$. $N_{NB}^{PRS}$ is a number of the narrow bands in which the transmission resources for the PRS exist. In this embodiment, $N_{NB}^{PRS}=4$, and four narrow bands are respectively {a narrowband 1, a narrowband 2, a narrowband 3, a narrowband 4}. $I_{NB}$ is an index of a narrowband, in $N_{NB}^{PRS}$ narrow bands, in which a transmission resource for the PRS in a $j^{th}$ time length exists, and $1 \leq j \leq 4$. As shown in FIG. 14, when j=1, $I_{NB}$=1, that is, a narrowband in which a transmission resource for the PRS in a first time length exists is the narrowband 1. When j=2, $I_{NB}$=2, that is, a narrowband in which a transmission resource for the PRS in a second time length exists is the narrowband 2. When j=3, $I_{NB}$=3 that is, a narrowband in which a transmission resource for the PRS in a third time length exists is the narrowband 3.

Fourteenth Implementation

In a narrowband communications system, jointly encoding is performed on a transmission period $T_{PRS}$ and a transmission offset $\Delta_{PRS}$ of a transmission resource for a Positioning Reference Signal (PRS), and the transmission period $T_{PRS}$ and the transmission offset $\Delta_{PRS}$ are indicated by using an index $I_{PRS}$. The offset $\Delta_{PRS}$ is used to indicate a deviation between a start location of the transmission resource for the PRS in the period $T_{PRS}$ and a start location of the period $T_{PRS}$, and a measurement unit of $\Delta_{PRS}$ is 40 subframes.

A value of $I_{PRS}$ is shown in Table 4, and is described by using 9 bits.

Figure 15:
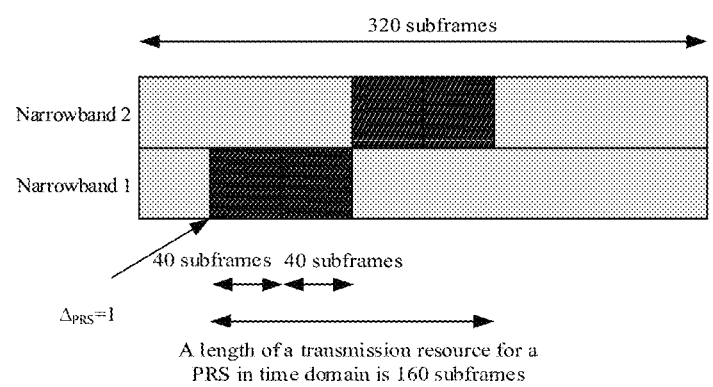
FIG. 15 is a schematic diagram of PRS resource mapping in an optional subframe according to an embodiment of the disclosure.

In this embodiment, if $I_{PRS}$ is 5, it indicates that $T_{PRS}$ is configured to be 320 subframes, and $\Delta_{PRS}=I_{PRS}$ 4=1, which indicates that the deviation between the start location of the transmission resource for the PRS in the period $T_{PRS}$ and the start location of the period $T_{PRS}$ is 40 subframes, as shown in FIG. 15.

A time domain length occupied by the transmission resource for the PRS in the period $T_{PRS}$ is T, and T includes K time lengths. The time length is equal to M subframes.

In this embodiment, if M=40, K=4, and K time lengths are continuously distributed in a time domain, the time domain length T occupied by the transmission resource for the PRS in the period $T_{PRS}$ is 160 subframes, as shown in FIG. 15.

Target subframes, allowed for transmitting the PRS, in the time length are determined according to subframe configuration information. In this embodiment, the subframe configuration information is a bitmap of a 40-bit length. A bit "1" represents that a corresponding subframe is the target subframe of the PRS, while a bit "0" represents that a corresponding subframe is not the target subframe of the PRS. In this embodiment, the bitmap of a 40-bit length is {1, 1, 1, 1, 1, 0, 0, 0, 0, 0, 1, 1, 1, 1, 1, 0, 0, 0, 0, 0, 1, 1, 1, 1, 1, 0, 0, 0, 0, 0, 1, 1, 1, 1, 1, 0, 0, 0, 0, 0}. In this embodiment, the subframe configuration information of the four time lengths is the same.

In this embodiment, narrow bands in which the transmission resources for the PRS in the four time lengths exist are determined according to a formula $I_{NB,j}=\mathrm{mod}(\lfloor j/Q \rfloor, N_{NB}^{PRS})$. Q=2, and $N_{NB}^{PRS}$ is a number of the narrow bands in which the transmission resources for the PRS exist. In this embodiment, $N_{NB}^{PRS}=2$, and two narrow bands are {a narrowband 1, a narrowband 2}. $(I_{NB,j}+1)$ is an index of a narrowband, in $N_{NB}^{PRS}$ narrow bands, in which a transmission resource for the PRS in a $j+1^{th}$ time length exists, and $0 \leq j \leq 3$. As shown in FIG. 14, when j=0, $I_{NB}$=0, that is, a narrowband in which a transmission resource for the PRS in a first time length exists is the narrowband 1. When j=1, $I_{NB}$=0, that is, a narrowband in which a transmission resource for the PRS in a second time length exists is the narrowband 1. When j=2, $I_{NB}$=1, that is, a narrowband in which a transmission resource for the PRS in a third time length exists is the narrowband 2. When j=3, $I_{NB}$=1, that is, a narrowband in which a transmission resource for the PRS in a fourth time length exists is the narrowband 2.

Fifteenth Implementation

In a narrowband communications system, jointly encoding is performed on a transmission period $T_{PRS}$ and a transmission offset $\Delta_{PRS}$ of a transmission resource for a PRS, and the transmission period $T_{PRS}$ and the transmission offset $\Delta_{PRS}$ are indicated by using an index $I_{PRS}$. The offset $\Delta_{PRS}$ is used to indicate a deviation between a start location of the transmission resource for the PRS in the period $T_{PRS}$ and a start location of the period $T_{PRS}$, and a measurement unit of $\Delta_{PRS}$ is 40 subframes.

A value of $I_{PRS}$ is shown in Table 2, and is described by using 10 bits.

In this embodiment, if $I_{PRS}$ is 5, it indicates that $T_{PRS}$ is configured to be 320 subframes, and $\Delta_{PRS}=I_{PRS}-4=1$, which indicates that the deviation between the start location of the transmission resource for the PRS in the period $T_{PRS}$ and the start location of the period $T_{PRS}$ is 40 subframes, as shown in FIG. 14.

A time domain length occupied by the transmission resource for the PRS in the period $T_{PRS}$ is T, and T includes K time lengths. The time length is M subframes.

In this embodiment, if M=40, K=4, and K time lengths are continuously distributed in a time domain, the time domain length T occupied by the transmission resource for the PRS in the period $T_{PRS}$ is 160 subframes, as shown in FIG. 14.

In this embodiment, in the narrowband communications system, valid subframes in the narrowband communications system are indicated by using a bitmap of a 40-bit length in the time length (M=40 subframes). For example, a total of 15 subframes are indicated as valid subframes, and 25 subframes are invalid subframes.

In this embodiment, target subframes allowed for transmitting the PRS is configured in the invalid subframes, and the target subframes allowed for transmitting the PRS in the time length is determined according to subframe configuration information. In this embodiment, the subframe configuration information is a bitmap of a 20-bit length, indicating whether the first 20 invalid subframes in the invalid subframes are target subframes of the PRS. A bit "1" represents a corresponding subframe is the target subframe of the PRS, while a bit "0" represents a corresponding subframe is not the target subframe of the PRS. In this embodiment, the subframe configuration information of the four time lengths is the same.

In this embodiment, the subframe of the PRS is not used as the target subframe of the PRS when the subframe is at least one of:

a subframe in which an NPBCH exists,
a subframe in which an NPSS exists,
a subframe in which an NSSS exists, or
a subframe in which an NPDSCH carrying an NSIB1 exists.

In the disclosure, specified information related to transmission of a PRS is obtained, where the specified information include at least one of a period, an offset, duration, subframe configuration information and narrowband information; and a transmission resource for the PRS is determined based on the specified information, and the PRS is transmitted by using the transmission resource. In this way, a technical problem that there is currently no effective solution for transmitting a PRS in an NB-IoT system is resolved. In addition, according to the method described in the disclosure, a base station can flexibly configure, according to an actual transmission status of downlink data, a resource for transmitting the PRS. On one hand, positioning performance of terminal devices with different coverage levels is ensured; and on the other hand, blocking caused by PRS transmission to normal downlink data transmission is avoided to some extent.

By means of the above description of the embodiments, those skilled in the art can clearly understand that the above method in the embodiments may be implemented by means of software and a necessary general-purpose hardware platform. Certainly, the hardware may be used, but the former is a better implementation manner in many cases. Based on this understanding, the technical solution of the disclosure essentially, or a part contributing to the prior art, may be embodied in a form of a software product. The computer software product is stored on a storage medium (such as a ROM/RAM, a magnetic disk, an optical disk), and includes several instructions to enable a terminal device (may be a mobile phone, a computer, a server, or a network device) to execute the method according to each embodiment of the disclosure. In other words, the embodiment of the disclosure further provides a computer storage medium, where the computer storage medium includes a group of instructions, and when the instructions are executed, causes at least one processor to execute the method described in the first Embodiment.

Second Embodiment

The embodiment of the disclosure further provides an apparatus for transmitting a positioning reference signal. The apparatus is configured to implement the foregoing embodiment and preferred implementations, and content that has been described is not repeated. As used below, the term "module" may implement the combination of software and/or hardware having predetermined functions. Although the apparatus described in the following embodiments are preferably implemented by software, implementation by hardware or the combination of the software and the hardware is also possible and may be conceived.

Figure 11:
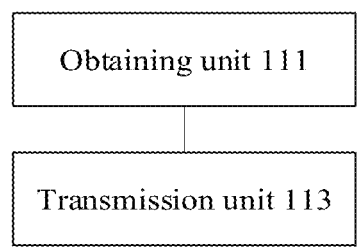
FIG. 11 is a schematic diagram of an apparatus for transmitting a positioning reference signal according to an embodiment of the disclosure.

FIG. 11 is a schematic diagram of an apparatus for transmitting a positioning reference signal according to an embodiment of the disclosure. As shown in FIG. 11, the apparatus may include an obtaining unit 111 and a transmission unit 113.

The obtaining unit 111 is configured to obtain specified information related to transmission of a Positioning Reference Signal (PRS), where the specified information includes at least one of a period, an offset, a duration, subframe configuration information, or narrowband information.

The transmission unit 113 is configured to determine a transmission resource for the PRS based on the specified information, and transmit the PRS by using the transmission resource.

According to the foregoing embodiment, when the Positioning Reference Signal (PRS) needs to be transmitted, the obtaining unit obtains the specified information related to transmission of the Positioning Reference Signal (PRS), where the specified information includes at least one of the period, the offset, the duration, the subframe configuration information, or the narrowband information; and the transmission unit determines the transmission resource for the PRS based on the specified information, and transmits the PRS by using the transmission resource. In this way, a technical problem that there is currently no effective solution for transmitting a PRS in an NB-IoT system is resolved, and a technical effect of transmitting a PRS in the NB-IoT system is achieved.

Optionally, the foregoing apparatus may be applied to, but not limited to, a base station, a terminal, or the like.

In the foregoing embodiment, the transmission resource includes at least one of a target radio frame, a target subframe, or a target narrowband that are allowed for transmitting the PRS.

It should be noted that, the PRS involved in this application is a narrowband PRS, and the foregoing specified information may be predefined, or indicated to a terminal device by using signaling, or the foregoing specified information may be transferred by using existing information as a carrier, and the application is not limited to this. Through configuration, the base station can flexibly configure, according to an actual transmission status of downlink data, a subframe resource for transmitting the PRS, so that blocking caused by PRS transmission to normal downlink data transmission is avoided to some extent.

In the foregoing embodiment, the transmission resource includes at least one of a target radio frame, a target subframe, or a target narrowband that are allowed for transmitting the PRS. The PRS has at least one of the following characteristics: a sequence generation manner of the PRS is the same as that of a Narrowband Reference Signal (NRS), where using the sequence generation manner that is the same as that of the NRS facilitates simplifying the design of the PRS; the PRS is not mapped to an Orthogonal Frequency Division Multiplexing (OFDM) symbol in which there is NRS transmission; the PRS is not mapped to an OFDM symbol in which there is LTE Cell-specific Reference Signal (CRS) transmission; and the PRS is not mapped to an LTE Physical Downlink Control Channel (PDCCH) region, where not mapping to an OFDM symbol in which there is NRS or LTE CRS transmission and not mapping to the LTE PDCCH region facilitates using all power for PRS transmission, thereby improving PRS-based positioning performance; and for any of target OFDM symbols allowed for transmitting the PRS, the PRS is mapped to two resource elements in the target OFDM symbol.

In the foregoing embodiment, the PRS has at least one of the following characteristics: a sequence generation manner of the PRS is the same as that of a Narrowband Reference Signal (NRS); the PRS is not mapped to an Orthogonal Frequency Division Multiplexing (OFDM) symbol, in which there is NRS transmission, in the target subframe; the PRS is not mapped to an OFDM symbol, in which there is LTE Cell-specific Reference Signal (CRS) transmission, in the target subframe; the PRS is not mapped to an LTE Physical Downlink Control Channel (PDCCH) region in the target subframe; and for any of target OFDM symbols allowed for transmitting the PRS in the target subframe, the PRS is mapped to two resource elements in the target OFDM symbol.

In another manner, the PRS may alternatively have at least one of the following characteristics: the PRS is not mapped to a resource element that is used for transmitting an NRS in the target subframe; the PRS is not mapped to a resource element that is used for transmitting an LTE CRS in the target subframe; or the PRS is not mapped to an LTE PDCCH region in the target subframe.

Optionally, the target subframe is a valid subframe or an invalid subframe.

For an in-band operation, if the target subframe is a valid subframe, the PRS is mapped to all resource elements in the target subframe that are not used as an LTE PDCCH region and that are not used for transmitting an LTE CRS or an NRS (that is, the PRS is not mapped to a resource element that is used as an LTE PDCCH region, is not mapped to a resource element that is used for transmitting an LTE CRS, and is not mapped to a resource element that is used for transmitting an NRS); or the PRS is mapped to all resource elements that are in OFDM symbols of the target subframe except the first three OFDM symbols and that are not used for transmitting an LTE CRS or an NRS (that is, the PRS is not mapped to the first three OFDM symbols, is not mapped to a resource element that is used for transmitting an LTE CRS, and is not mapped to a resource element that is used for transmitting an NRS). If the target subframe is an invalid subframe, the PRS is mapped to all resource elements in the target subframe that are not used as an LTE PDCCH region and that are not used for transmitting an LTE CRS (that is, the PRS is not mapped to a resource element that is used as an LTE PDCCH region and is not mapped to a resource element that is used for transmitting an LTE CRS); or the PRS is mapped to all resource elements that are in OFDM symbols of the target subframe except the first three OFDM symbols and that are not used for transmitting an LTE CRS (that is, the PRS is not mapped to the first three OFDM symbols, and is not mapped to a resource element that is used for transmitting an LTE CRS; in this case, a resource element that is occupied by the PRS is similar to that of a secondary synchronization signal).

For a standalone operation or a guard band operation, if the target subframe is a valid subframe, the PRS is mapped to all resource elements in the target subframe that are not used for transmitting an NRS (that is, the PRS is not mapped to a resource element that is used for transmitting an NRS), or the PRS is mapped to all resource elements that are in OFDM symbols of the target subframe except the first three OFDM symbols and that are not mapped to an NRS (that is, the PRS is not mapped to the first three OFDM symbols and is not mapped to a resource element that is used for transmitting an NRS). If the target subframe is an invalid subframe, the PRS is mapped to all resource elements in the target subframe, or the PRS is mapped to all resource elements that are in OFDM symbols of the target subframe except the first three OFDM symbols (that is, the PRS is not mapped to the first three OFDM symbols).

Locations of the two resource elements are determined according to at least one of the following parameters: a Physical Cell Identity (PCI), a radio frame index, a subframe index, an OFDM symbol index, or a narrowband index. Specifically, the locations of the two resource elements are determined according to the following equation: $k=6m\pm(6-l+v_{shift})$ mod (6), where m=0,1; k indicates an index of a resource element that is used for transmitting the PRS in the target OFDM symbol, l indicates an index of the target OFDM symbol, and $v_{shift}$ indicates a cell-specific frequency shift and is determined according to at least one of the following parameters: the Physical Cell Identity (PCI), the radio frame index, the subframe index, or the narrowband index.

In an optional embodiment, the target subframe is a valid subframe or an invalid subframe. For an in-band operation, if the target subframe is a valid subframe, the target OFDM symbol allowed for transmitting the PRS is an OFDM symbol that is in the target subframe and that is not used as the LTE PDCCH region and not used for transmitting an LTE CRS or an NRS, or an OFDM symbol that is in OFDM symbols of the target subframe except the first three OFDM symbols and that is not used for transmitting an LTE CRS or an NRS. A terminal assumes that there is always LTE CRS transmission or there is always no LTE CRS transmission in the target subframe, or a base station indicates whether there is LTE CRS transmission in the target subframe. If the target subframe is an invalid subframe, the target OFDM symbol allowed for transmitting the PRS is an OFDM symbol that is in the target subframe and that is not used as the LTE PDCCH region and not used for transmitting an LTE CRS, or an OFDM symbol that is in OFDM symbols of the target subframe except the first three OFDM symbols and that is not used for transmitting an LTE CRS. A terminal assumes that there is always LTE CRS transmission or there is always no LTE CRS transmission in the target subframe, or a base station indicates whether there is LTE CRS transmission in the target subframe.

In addition, when an indicator indicating whether Physical Cell Identity (PCI) is the same is set to True, if the target subframe is a valid subframe, the terminal assumes that there is always LTE CRS transmission in the target subframe.

In an optional embodiment, the target subframe is a valid subframe or an invalid subframe. For a standalone operation and a guard band operation, if the target subframe is a valid subframe, the target OFDM symbol allowed for transmitting the PRS is an OFDM symbol that is in the target subframe and that is not used for transmitting a Narrowband Reference Signal (NRS) or an OFDM symbol that is in the target subframe, whose index is greater than 0, and that is not used for transmitting a Narrowband Reference Signal (NRS). If the target subframe is an invalid subframe, the target OFDM symbols allowed for transmitting the PRS are all OFDM symbols in the target subframe or all OFDM symbols in the target subframe whose indexes are greater than 0.

Optionally, the transmission unit includes a first determining module, configured to determine, based on the period, the offset, and the duration, the target radio frame allowed for transmitting the PRS.

The first determining module includes a first determining submodule and a second determining submodule. The first determining submodule is configured to determine, according to a relational expression, a start radio frame corresponding to the period $T_{PRS}$ and the offset $\Delta_{PRS}$, where the relational expression is $(n_f - \Delta_{PRS})$ mod $(T_{PRS})=0$, and $n_f$ is a number of the start radio frame. The second determining submodule is configured to determine, based on the start radio frame and the duration, the target radio frame for transmitting the PRS. The duration is used to indicate that the PRS is transmitted in $N_{PRS}$ consecutive radio frames starting from the start radio frame, and $N_{PRS}$ is a value of the duration and is a positive integer not less than 1. To simultaneously ensure positioning performance of the terminal devices with different coverage levels (including normal, extended, and extreme coverage), relatively long transmission duration may be set. For example, assuming that a value range of $N_{PRS}$ is 5, 10, 20, or 40, $N_{PRS}$ may be set to 40.

In an optional embodiment, the transmission unit includes a second determining module, configured to determine, based on the subframe configuration information, target subframes allowed for transmitting the PRS in the target radio frame.

The foregoing subframe configuration information is an N×10 bitmap, and is used to indicate whether each of N×10 subframes in every N consecutive target radio frames is the target subframe, where N is an integer greater than 0.

It should be noted that, when the target subframe is a subframe for transmitting a specified channel or a specified signal, transmitting the PRS in the target subframe is not performed, where the specified channel or the specified signal includes at least one of: a Narrowband Physical Broadcast Channel (NPBCH), a Narrowband Primary Synchronization Signal (NPSS), a Narrowband Secondary Synchronization Signal (NSSS), a Narrowband Physical Downlink Shared Channel (NPDSCH) carrying a Narrowband System Information Block 1 (NSIB1), or an NPDSCH carrying a narrowband System Information (SI) message. When the target subframe is a subframe for transmitting a specified channel or a specified signal, transmitting the PRS in the target subframe is not performed, or data of the specified channel or the specified signal at a location of a resource element occupied by the PRS is punctured, where the specified channel or the specified signal includes at least one of: a Narrowband Physical Downlink Control Channel (NPDCCH), a non-broadcast NPDSCH, or a downlink channel or a downlink signal of a Long Term Evolution (LTE) system.

In an optional embodiment, the transmission unit includes a third determining module, configured to determine, based on the narrowband information, at least one target narrowband allowed for transmitting the PRS.

When there are more than one target narrowband, the PRS is transmitted in the more than one target narrowband in a frequency-hopping manner. A granularity of the frequency-hopping is an integer number of radio frames. A number of radio frames corresponding to the granularity of the frequency-hopping is equal to 1/10 of a number of bits of the subframe configuration information.

After the PRS is transmitted by using the transmission resource, the base station instructs, by using a Msg2 message, the terminal to feed back position information. When a random access process is triggered by Downlink Control Information (DCI), the terminal feeds back the position information in a Msg3 message. When a random access process is not triggered by DCI, the terminal feeds back the position information in a Msg5 message.

To implement information exchange with a neighboring base station, before, after, or during transmitting the PRS by using the transmission resource, the terminal also obtains information about the neighboring base station from a serving base station. The information about the neighboring base station includes at least one of: information related to PRS transmission, configuration information of a valid subframe, an indicator indicating whether PCI is the same, an indication of whether there is LTE CRS transmission in the target subframe allowed for transmitting the PRS, or a size of an LTE PDCCH region. The PRS sent by the neighboring base station is received based on the information about the neighboring base station.

In the disclosure, the PRS is transmitted according to at least one of the following parameters: the transmission period, the transmission offset, the transmission duration, or an available subframe configuration for transmission. In this way, positioning performance of terminal devices with different Coverage Levels (CL) is ensured, and blocking caused by PRS transmission to normal downlink data transmission is avoided to some extent.

It should be noted that the foregoing modules may be implemented by using software or hardware. For the latter, the foregoing modules may be implemented in, but not limited to, the following manner: the foregoing modules are all located in a same processor; or the foregoing modules are located in different processors in an arbitrary combination manner.

Third Embodiment

This embodiment of the disclosure further provides a storage medium. Optionally, in this embodiment, the foregoing storage medium may be configured to store program code for performing the following steps.

At S1, specified information related to transmission of a Positioning Reference Signal (PRS) is obtained, where the specified information includes at least one of a period, an offset, a duration, subframe configuration information, or narrowband information.

At S2, a transmission resource for the PRS is determined based on the specified information, and the PRS is transmitted by using the transmission resource.

Optionally, in this embodiment, the foregoing storage medium may include but is not limited to various media that can store program code, such as a USB flash drive, a Read-Only Memory (ROM), a Random Access Memory (RAM), a removable hard disk, a magnetic disk, or an optical disc.

Optionally, in this embodiment, a processor performs the following steps according to the program code stored in the storage medium: obtaining specified information related to transmission of a Positioning Reference Signal (PRS), where the specified information includes at least one of a period, an offset, a duration, subframe configuration information, or narrowband information; and determining a transmission resource for the PRS based on the specified information, and transmitting the PRS by using the transmission resource.

Optionally, for specific examples in this embodiment, reference may be made to the examples described in the foregoing embodiments and the optional implementations, and details are not described herein in this embodiment.

It will be obvious to persons skilled in the art that the modules or steps of the disclosure may be implemented by a universal computing device, and these modules or steps may be concentrated on a single computing device or distributed on a network consisting of a plurality of computing device. Optionally, the modules or steps may be implemented by programmable codes executable by the computing devices, so that these modules or steps may be stored in a storage device for execution with the computing devices. In some circumstances, the shown or described steps may be executed in sequences different from those described herein, the modules or the steps may be made into integrated circuit modules respectively, or multiple modules or steps therein may be made into a single integrated circuit module. Thus, the disclosure is not limited to any specific combination of hardware and software.

The foregoing is merely illustrative of the preferred embodiments of the disclosure and is not intended to limit the disclosure, and various changes and modifications may be made by those skilled in the art. Any modifications, equivalent substitutions, improvements, and the like within the spirit and principles of the disclosure are intended to be included within the scope of the disclosure.

INDUSTRIAL APPLICABILITY

In the embodiments of the disclosure, specified information related to transmission of a PRS is obtained, where the specified information include at least one of a period, an offset, duration, subframe configuration information, or narrowband information; a transmission resource for the PRS is determined based on the specified information, and the PRS is transmitted by using the transmission resource. In this way, a technical effect of transmitting a PRS in an NB-IoT system is achieved.

The invention claimed is:

1. A method of transmitting a Positioning Reference Signal (PRS), performed by a wireless communication node, comprising:

determining specified information related to transmission of the PRS, wherein the specified information comprises at least one of a period, an offset, a duration, or subframe configuration information; and determining a target subframe for transmitting the PRS based on the specified information, and transmitting the PRS by using the target subframe, wherein the PRS is mapped to two resource elements in a target Orthogonal Frequency Division Multiplexing (OFDM) symbol in the target subframe, wherein the target OFDM symbol is any one of OFDM symbols in the target subframe allowed for transmitting the PRS, and wherein the target subframe is an invalid subframe, and for a standalone operation or a guard band operation, all the OFDM symbols in the target subframe are allowed for transmitting the PRS.

2. The method of claim 1, wherein locations of the two resource elements are determined according to the following equation:

$k=6m+(6-l+v_{shift})\mod(6)$, wherein $m=0$ or 1;

wherein k indicates an index of a resource element that is used for transmitting the PRS in the target OFDM symbol, l indicates an index of the target OFDM symbol, and $v_{shift}$ indicates a cell-specific frequency shift and is determined according to at least one of: a Physical Cell Identity (PCI), a radio frame index, a subframe index, or a narrowband index.

3. The wireless communication node, comprising a processor, wherein the processor is configured to execute the method for transmitting the PRS according to claim 1.

4. The apparatus of claim 3, wherein locations of the two resource elements are determined according to the following equation:

$k=6m+(6-l+v_{shift})\mod(6)$, wherein $m=0$ or 1;

wherein k indicates an index of a resource element that is used for transmitting the PRS in the target OFDM symbol, l indicates an index of the target OFDM symbol, and $v_{shift}$ indicates a cell-specific frequency shift and is determined according to at least one of: a Physical Cell Identity (PCI), a radio frame index, a subframe index, or a narrowband index.

5. A non-transitory computer-readable storage medium having instructions stored therein, wherein, when executed by at least one processor, cause the at least one processor to perform the method for transmitting the PRS according to claim 1.

6. A method of transmitting a Positioning Reference Signal (PRS), comprising:

receiving, by a wireless communication device, the PRS carried by a target subframe, wherein the target subframe is determined based on specified information, wherein the specified information comprises at least one of a period, an offset, a duration, or subframe configuration information, and wherein the PRS is mapped to two resource elements in a target Orthogonal Frequency Division Multiplexing (OFDM) symbol in the target subframe, wherein the target OFDM symbol is any one of OFDM symbols in the target subframe allowed for transmitting the PRS, and wherein the target subframe is an invalid subframe, and for a standalone operation or a guard band operation, all the OFDM symbols in the target subframe are allowed for transmitting the PRS.

7. The method of claim 6, wherein locations of the two resource elements are determined according to the following equation:

$k=6m+(6-l+v_{shift})\mod(6)$, wherein $m=0$ or 1;

wherein k indicates an index of a resource element that is used for transmitting the PRS in the target OFDM symbol, l indicates an index of the target OFDM symbol, and $v_{shift}$ indicates a cell-specific frequency shift and is determined according to at least one of: a Physical Cell Identity (PCI), a radio frame index, a subframe index, or a narrowband index.

8. The wireless communication device, comprising a processor, wherein the processor is configured to execute the method for transmitting the PRS according to claim 6.

9. The terminal of claim 8, wherein locations of the two resource elements are determined according to the following equation:

$k=6m+(6-l+v_{shift})\mod(6)$, wherein $m=0$ or 1;

wherein k indicates an index of a resource element that is used for transmitting the PRS in the target OFDM symbol, l indicates an index of the target OFDM symbol, and $v_{shift}$ indicates a cell-specific frequency shift and is determined according to at least one of: a Physical Cell Identity (PCI), a radio frame index, a subframe index, or a narrowband index.

* * * * *